(12) United States Patent
Isozaki et al.

(10) Patent No.: US 6,345,156 B1
(45) Date of Patent: Feb. 5, 2002

(54) FLASH UNIT

(75) Inventors: Makoto Isozaki, Tokyo; Junichi Takagi, Kanagawa; Kazumi Koike, Kanagawa; Mitsuhiro Moriya, Kanagawa; Keiji Uchiyama, Kanagawa; Yukitsugu Hata, Kanagawa, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/486,338

(22) PCT Filed: Aug. 21, 1998

(86) PCT No.: PCT/JP98/03701

§ 371 Date: Feb. 25, 2000

§ 102(e) Date: Feb. 25, 2000

(87) PCT Pub. No.: WO99/10772

PCT Pub. Date: Mar. 4, 1999

(30) Foreign Application Priority Data

Aug. 25, 1997 (JP) .............................. 9-228524
Sep. 9, 1997 (JP) .............................. 9-243869

(51) Int. Cl.$^7$ ............................................. G03B 15/05
(52) U.S. Cl. ..................... 396/176; 396/203; 396/267
(58) Field of Search ................................ 396/267, 176, 396/203, 202, 201, 205, 206

(56) References Cited

U.S. PATENT DOCUMENTS

| | | | | |
|---|---|---|---|---|
| 4,260,231 A | * | 4/1981 | Kawarada | 396/176 |
| 4,318,602 A | * | 3/1982 | Yamanaka et al. | 396/176 |
| 4,322,148 A | * | 3/1982 | Yoshikawa | 396/203 X |
| 5,361,109 A | * | 11/1994 | Kamoda et al. | 396/176 |
| 5,892,993 A | | 4/1999 | Moriya | 396/317 |
| 5,950,025 A | | 9/1999 | Uchiyama et al. | 396/315 |
| 5,966,552 A | | 10/1999 | Hata | 396/206 |
| 6,091,906 A | * | 7/2000 | Hata | 396/206 |

FOREIGN PATENT DOCUMENTS

| | | |
|---|---|---|
| JP | 7-122389 | 5/1995 |
| JP | 8-115796 | 5/1996 |

* cited by examiner

Primary Examiner—W. B. Perkey
(74) Attorney, Agent, or Firm—Young & Thompson

(57) ABSTRACT

In a flash circuit of a flash device, a Zener diode (37) is connected to a tap point (23f) located at an intermediate position of a secondary coil of an oscillation transformer (23). The oscillation transformer (23) and an oscillation transistor (22) constitutes an oscillation circuit. A potential at the tap point (23f) changes proportionally to a voltage charged in a main capacitor (41). When the main capacitor (41) is charged up to a set voltage, the Zener diode (37) conducts a Zener current, which activates a stopping transistor (38) and thus deactivates the oscillation circuit. When a flash charge switch (51) is turned on, an end of a light guide portion of a charge condition indicator (60) protrudes out of a lens-fitted film unit. When the main capacitor (41) is charged up to the set voltage, a light emission element starts lighting, and the light from the light emission element is projected from the end of the light guide portion.

6 Claims, 19 Drawing Sheets

FLASH UNIT

FIELD OF THE ART

The present invention relates to a flash device, and more particularly to a flash device which is suitable for being incorporated in a lens-fitted photo film unit that contains a roll of photo filmstrip and is provided with a simple photographic mechanism including a taking lens.

BACKGROUND ARTS

When the subject brightness is so low that a proper exposure would not be provided without any artificial illumination, a flash device is often used to project light toward the subject synchronously with the shutter release. Since compact cameras and lens-fitted photo film units have an inexpensive lens system of a relative large f-number, most of them are provided with a built-in flash device. To make a flash photography, it is necessary to charge the main capacitor up to the set voltage prior to the shutter release. The conventional flash devices start charging in response to an actuation of a flash charge switch.

A flash circuit has recently been known, for example from JPA 7-122389, wherein once a flash charge switch is turned on the main capacitor continues to be charged even after the flash charge switch is turned off. The flash circuit stops charging while the main capacitor is at the set charge voltage. Hereinafter, this type of flash device will be referred to as an autostop flash circuit.

An example of autostop flash circuit is shown in FIG. 24, which has fundamentally the same configuration as that disclosed in JPA 7-122389, except some minor differences. In the flash circuit of FIG. 24, when a flash charge switch 200 is turned on, an oscillation transistor 201 is activated and starts oscillating due to positive feedback of an oscillation transformer 202. The oscillation causes an increase in a primary current that flows through a primary coil 202a, i.e. a collector current that flows to the collector of the oscillation transistor 200. As a result, an electromotive force induces a current through a secondary coil 202b, and the current charges a main capacitor 204 through a rectifying diode 203.

Since the collector current flows through the oscillation transistor 201, a latching transistor 205 is turned on. Thereafter when the increment of the primary current goes down, a back electromotive force is generated in the secondary coil 202b, and the current fed back from the oscillation transformer 202 to the oscillation transistor 201, i.e. base current of the oscillation transistor 201, begins to decrease. However, a voltage from a battery 206 is applied to the base of the oscillation transistor 201 through the latching transistor 205 as being in the ON state, the oscillation transistor 201 is not completely turned off. Therefore, the primary current starts flowing again, thereby the oscillation transistor 201 continues to oscillate and charge the main capacitor 204.

A Zener diode 207 with a Zener voltage of 300V is provided for starting conducting a Zener current when the main capacitor 204 is charged up to a set voltage of 300V. Because a base current is applied to a base of a stopping transistor 208 due to the Zener current, the stopping transistor 208 is turned on. When the stopping transistor 208 is turned on, the emitter and the base of the oscillation transistor 201 are connected to each other, so that the oscillation transistor 201 is completely turned off, and thus the latching transistor 205 is turned off. In this way, the oscillation stops to stop charging the main capacitor 204 when the main capacitor 204 is charged up to the set voltage.

In the above autostop flash circuit, since the charge voltage of the main capacitor is applied to the Zener diode to conduct the Zener current for activating the stopping transistor when the charge voltage reaches the set value, the Zener diode must have a high Zener voltage, e.g. 300V, in correspondence with the set charge voltage. As the Zener diode with high Zener voltage is expensive, it raises the cost of the flash circuit. In addition, the conventional autostop flash circuit requires a lot of space for mounting various elements as above which are necessary for the automatic continuation and stopping of charging.

Meanwhile, a lens-fitted photo film unit having a flash device incorporated therein is widely known. Since the flash device for the lens-fitted photo film unit is required to be inexpensive and compact, the flash switch is constituted of a metal blade and contact chips formed on a flash circuit board such that the metal blade is brought into contact with the contact chips through a manual operation member, to close the flash circuit and thus cause the flash circuit to start charging. Conventionally, the manual operation member is a push button or a sliding button. Some of the conventional manual operation members are provided with a fastening mechanism by which the metal blade is kept in contact with the contact chips once the operation member is operated for a moment. Others are designed to bring the metal blade into contact with the contact chips only while the photographer operates the manual operation member.

The flash device of the lens-fitted photo film unit has been provided with a light emission element for indicating completion of charging the flash device. In the conventional lens-fitted photo film unit, the light emission element is placed behind an indication window formed through a rear wall of the lens-fitted photo film unit, or is placed in connection to a light guide that conducts light from the light emission element to a view field of a viewfinder.

Where the charge switch operation device is provided with the fastening device, the flash device keeps charging so long as the operation device is in the ON position. If the operation device is left in the charging position after the photography is terminated, the battery is wasted. As a result, the battery runs down and it becomes impossible to use the flash device before all of the available exposures are carried out. Such trouble will be prevented if only the photographer checks the position of the operation member or the light from the light emission element at the conclusion of photography. However, according to the configurations of the conventional lens-fitted photo film units, it is not easy to know the switching condition of the operation member at a glance, or the charge condition indicating light is not visible from the outside of the lens-fitted photo film unit. Therefore, the photographer can fail to reset the charge switch to the OFF position.

In view of the foregoing, a prime object of the present invention is to provide an autostop flash device which cuts the cost and space without lowering reliability and stability.

A further object of the present invention is to provide a flash device which is effective to prevent the photographer from forgetting to turn off the flash charge switch, and is also suitable especially for use in a lens-fitted photo film unit.

DISCLOSURE OF THE INVENTION

In a flash device comprising an oscillation circuit that starts oscillating when a flash charge switch is turned on, wherein the oscillation circuit is comprised of an oscillation transformer having a primary coil connected to a power source and a secondary coil connected to a main capacitor, and the secondary coil is inductively coupled to the primary coil such that a high voltage current is induced in the secondary coil while the oscillation circuit oscillates, and that the main capacitor is charged with the high voltage current up to a set charge voltage, the present invention is comprised of a tap point located at an intermediate position of the secondary coil, the tap point having a potential that changes proportionally to the charge voltage across the main capacitor; a Zener diode connected to the tap point, to conduct a Zener current when the potential at the tap point reaches a value that corresponds to the set charge voltage of the main capacitor; and a stopping transistor activated by the Zener current to stop the oscillation circuit from oscillating and thus stop charging the main capacitor when the main capacitor reaches the set charge voltage.

The flash device according to the invention makes it possible to use an inexpensive Zener diode with a low Zener voltage, so that it is possible to cut the cost of the flash device.

By charging a stopping capacitor with the Zener current that flows when the main capacitor reaches the set charge voltage and then applying current discharged from the stopping capacitor to the stopping transistor through a resistor, the stopping transistor keeps operating for a predetermined time. It ensures stopping charging the main capacitor, and also prevents unexpected interruption of charging that may be caused by noises.

Moreover, a temperature coefficient of a forward voltage of a rectifying diode that blocks current flowing from the tap point to the Zener diode should have an opposite polarity to a temperature coefficient of the Zener voltage of the Zener diode, such that the Zener diode and the rectifying diode form a mutual temperature compensating circuit. Thereby, the main capacitor is charged up to the constant set voltage without being affected by environmental temperature or the like.

To achieve the second object in a flash device comprising a flash circuit and a flash charge switch for charging the flash circuit, the present invention is characterized by comprising an indication device for indicating completion of charging the flash circuit, the indication device protruding outside when the flash charge switch is turned on.

As the indication device for indicating the completion of charging the flash circuit protrudes outside when the flash charge switch is turned on, it is easy to check if the flash charge switch is in the ON state or not. Accordingly, the present invention is effective to remind the photographer to turn off the charge switch when the flash circuit needs not charging. Thus, the flash device of the present invention solves the above described problem of wasting the battery and making the flash device useless for the following photography.

PREFERRED EMBODIMENT OF THE INVENTION

The present invention will be described in more detail with reference to the accompanying drawings.

Figure 1:
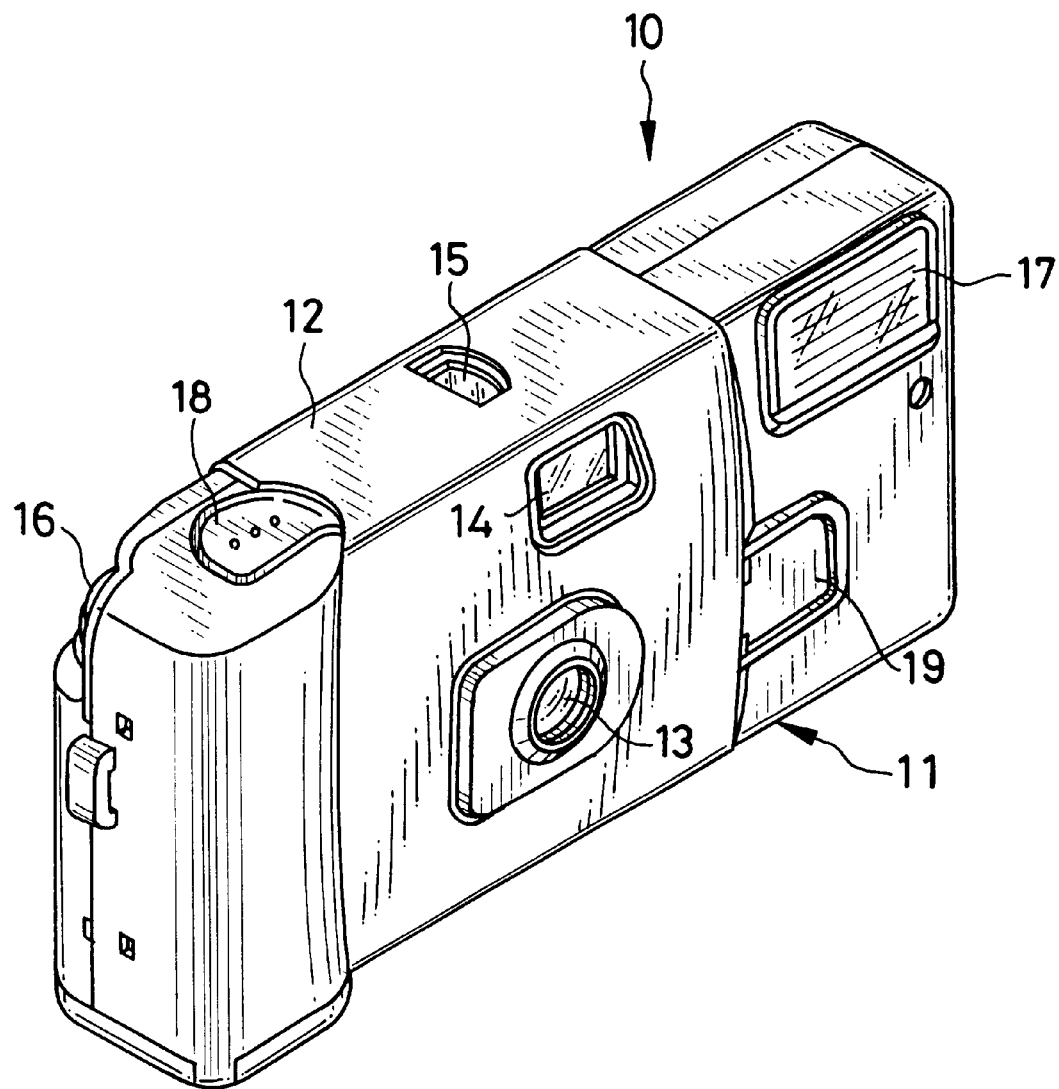
FIG. 1 is a perspective view of a lens-fitted photo film unit with a flash device according to a first embodiment of the invention.

Referring to FIG. 1, a lens-fitted photo film unit 10, hereinafter referred to as a film unit, has a unit body 11 containing a photo filmstrip. A simple photographic mechanism and a flash device are incorporated into the unit body 11. A decorative cardboard paper 12 is wrapped around the unit body 11. A taking lens 13, a finder objective window 14, a frame counter window 15, a film winding wheel 16, a flash projector 17, a shutter button 18, a charging operation member or charge button 19 and other necessary elements are exposed to the outside through openings of the cardboard paper 12 or located out of the cardboard paper 12. An indication window for indicating that the flash device is ready to flash is formed besides a viewfinder eyepiece, through they are not shown in the drawings.

Figure 2:
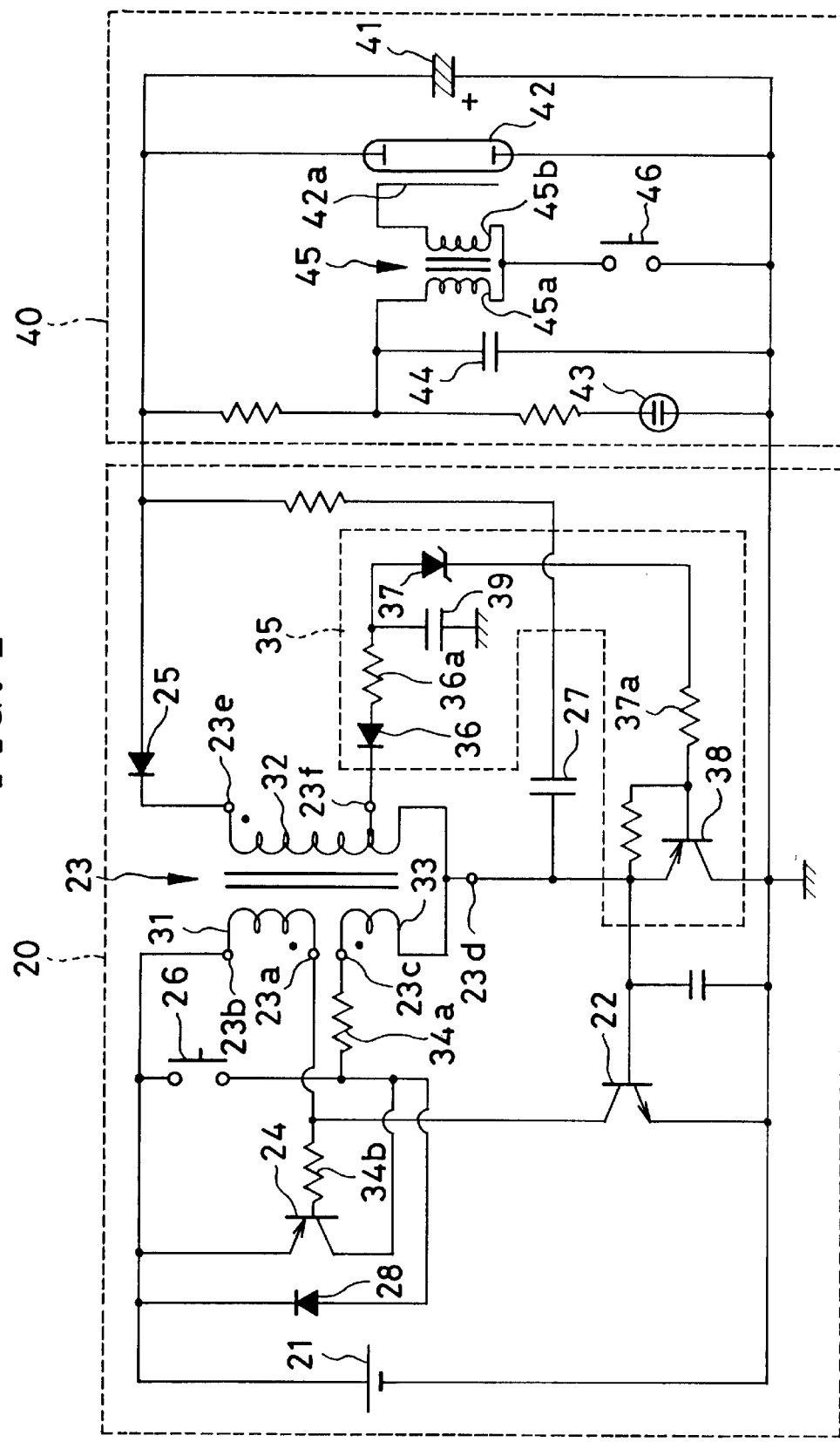
FIG. 2 is a circuit diagram of the flash device of the first embodiment of the invention.

Referring to FIG. 2 showing a flash circuit of the flash device, a flash charge switch 26 is turned on so long as the charge button 19 is depressed. Once the flash charge switch 26 is turned on for a moment by depressing the charge button 19, the flash circuit continues to charge a main capacitor 41 up to a set charge voltage even after the flash charge switch 26 is turned off as the photographer quits depressing the charge button 19. Once the main capacitor 41 is charged up to the set voltage, the main capacitor 41 is automatically repeatedly charged up to the set voltage immediately after each flashing.

The flash circuit roughly consists of a booster section 20 and a charging-discharging section 40. The booster section 20 is mainly constituted of a battery 21 of 1.5V as a power source, an oscillation transistor 22 of NPN type, an oscillation transformer 23, a latching transistor 24 of PNP type, a charge current rectifying diode 25, the flash charge switch 26, a recharging capacitor 27 and an oscillation stopping circuit 35.

The oscillation transformer 23 is constituted of a primary coil 31, a secondary coil 32 and a tertiary coil 33 which are inductively coupled to one another. In the oscillation transformer 23, terminals of the primary coil 23 are referred to as first and second terminals 23a and 23b, one terminal of the tertiary coil 33 is referred to as a third terminal 23c, another terminal of the tertiary coil 33, which is also one terminal of the secondary coil 32, is referred to as a fourth terminal 23d, and another terminal of the second coil 32 is referred to as a fifth terminal 23e. The oscillation transformer 23 has a tap point 23f at an intermediate position of a secondary coil 32, in addition to the first to fifth terminals 23a to 23e.

The first and second terminals 23a and 23b of the oscillation transformer 23 are connected to the collector of the oscillation transistor 22, and the plus pole of the battery 21, respectively. The third terminal 23c is connected to the plus terminal of the battery 21 through a resistor 34a and the flash charge switch 26. The fourth terminal 23d is connected to the base of the oscillation transistor 22, and the fifth terminal 23e is connected through the charge current rectifying diode 25 to the negative side of the charging-discharging section 40, that is, the minus terminal of the main capacitor 41. The cathode of the charge current rectifying diode 25 is connected to the fifth terminal 23e. The emitter of the oscillation transistor 22 is connected to the minus pole of the battery 21 and is grounded.

The oscillation transistor 22 and the oscillation transformer 23 constitute a well-known blocking oscillator that transforms the low voltage of the battery 21 to the high voltage for charging the main capacitor 41. The oscillation transistor 22 is activated to conduct its collector current to the primary coil 31 when the flash charge switch 26 is turned on. As the base current of the oscillation transistor 22 increases due to the positive feedback from the oscillation transformer 23, its collector current increases, and thus the oscillation transistor 22 oscillates.

While the oscillation transistor 22 oscillates, a high voltage, e.g. an alternating voltage of about 1000V, is generated in accordance with the turn ratio of the primary coil 31 to the secondary coil 32. The charge current rectifying diode 25 supplies the charging-discharging section 40 with only those secondary current flowing through the secondary coil 32 in a direction from the fifth terminal 23e to the fourth terminal 23d.

The latching transistor 24 applies a bias voltage to the base of the oscillation transistor 22 after the flash charging switch 26 is turned off, thereby to keep the oscillation transistor 22 oscillating. The latching transistor 24 is connected at its emitter to the plus pole of the battery 21, at its base to the collector of the oscillation transistor 22 through a resistor 34b, and at its collector to the base of the oscillation transistor 22 through the resistor 34a and the tertiary coil 33.

In this way, the latching transistor 24 is turned on in response to the activation of the oscillation transistor 22, so that the oscillation transistor 22 continues to oscillate even after the flash charge switch 26 is turned off, because of positive feedback from the latching transistor 24. It is possible to omit the latching transistor 24.

When a back electromotive force is generated in the tertiary coil 33 while the flash charging switch 26 is off, if there is no current loop or runaway for the back electromotive force, the oscillation of the blocking oscillator would not be stable, or it would take longer time to charge up the main capacitor 41. To avoid this problem, a looping diode 28 is provided. Anode of the looping diode 28 is connected through the resistor 34a to the third terminal 23c of the tertiary coil 33, and cathode thereof is connected to the plus pole of the battery 21, thereby forming a current loop for the back electromotive force on the tertiary coil 33.

The charging-discharging section 40 is constituted of the main capacitor 41, a flash discharge tube 42, a triggering electrode 42a, a neon lamp 43, a triggering capacitor 44, a triggering transformer 45, a triggering switch 46 and so forth. The main capacitor 41 is connected in parallel to the flash discharge tube 42. The positive terminal of the main capacitor 41 is also connected to the minus pole of the battery 21 and thus grounded. The negative terminal of the main capacitor 41 is connected to anode of the charge current rectifying diode 25. The set charge voltage of the main capacitor 41 is 300V in the present embodiment, so the flash discharge tube 42 is designed to flash light of a predetermined amount when the voltage of 300V is applied to it. Since the positive terminal of the main capacitor 41 is connected to the minus pole of the battery 21, the potential at the positive terminal of the main capacitor 41 is maintained to be the ground potential GND (=0V), so the potential at the negative terminal of the main capacitor 41 lowers with the charging. That is, the charge voltage is an absolute value that is equal to a potential difference between the positive and negative terminals of the main capacitor 41.

According to the second embodiment, an oscillation stopping circuit 35 is mainly constituted of a rectifying diode 36, a Zener diode 37 and a stopping transistor 38. The cathode of the rectifying diode 36 is connected to the tap point 23f, and the anode of the rectifying diode 36 is connected to the anode of the Zener diode 37 through a resistor 36a. The rectifying diode 36 is provided for rectifying the oscillating or alternating voltage at the tap point 23f, and tapping out only negative halves of the alternating voltage. The rectifying diode 36 also functions as a temperature compensating element for the Zener diode 37, as set force in detail later. A capacitor 39 is provided for smoothing the voltage from the rectifying diode 36, and applying it as a DC voltage to the Zener diode 37. The stopping transistor 38 has the base connected to the cathode of the Zener diode 37 through a resistor 37a, the emitter connected to the fourth terminal 23d of the oscillation transformer 23, and the collector grounded.

The potential level Va at the tap point 23f varies alternately in correspondence with the oscillation of the oscillation transformer 23. Beside that, the potential level Va in total changes proportionally to the charge voltage in the main capacitor 41. Since the main capacitor 41 is charged in the negative direction, so the potential Va at the tap point 23f goes down proportionally as the charge voltage increases.

The tap point 23f is located such that a potential difference or voltage "Vb–Va" between the fourth terminal 23d and the tap point 23f comes to a given voltage Von while an electromotive force is generated in the secondary coil 32 after the main capacitor 41 is charged up to a set charge voltage, e.g. 300V. More specifically, the tap point 23f is located such that the DC voltage applied across the Zener diode 37 reaches a Zener voltage Vz of the Zener diode 37 when the charge voltage across the main capacitor 41 reaches the set value.

The voltage Von is given by adding a voltage drop amount through the rectifying diode 36, e.g. about 0.6V, to a Zener voltage Vz, e.g. 10V, of the Zener diode 37. In this instance, the given voltage Von is 10.6V, and the tap point 23f is located where the turn number between the tap point 23f and the fourth terminal 23d is about 1/30 the total turn number of the secondary coil 32. However, if the Zener voltage Vz of the Zener diode 37 is 30V, the voltage Von is given as 30.6V, and the tap point 23f is located where the turn number between the tap point 23f and the fourth terminal 23d is about 1/10 the total turn number of the secondary coil 32.

According to the above circuit construction, the Zener diode 37 is supplied with the DC voltage which is obtained through the rectifying diode 36 and the smoothing capacitor 39 from the alternating voltage between the fourth terminal 23d and the tap point 23f, i.e. from the potential difference Vb–Va. Accordingly, the Zener voltage Vz of the Zener diode 37 may be low, e.g. 10V, so that an inexpensive Zener diode may be used as the Zener diode 37. When the main capacitor is charged up to the set voltage of 300V, the potential difference Vb–Va reaches the given value Von, and thus the Zener voltage Vz is applied across the Zener diode 37. Then, the Zener diode 37 conducts a Zener current of the opposite direction to the charging current.

Unless the Zener diode 37 conducts the Zener current, no current flows in the base of the stopping transistor 38, so that the stopping transistor 38 is in the OFF state. When the Zener diode 37 conducts the Zener current, i.e. when the cathode potential of the Zener diode 37 goes below 0V, a voltage higher than an activation voltage for the stopping transistor 38 is applied across the emitter-base circuit of the stopping transistor 38, so the stopping transistor 38 is turned on. When the stopping transistor 38 is turned on, the base and the emitter of the oscillation transistor 22 are connected to each other to have the same potential level, so that the oscillation transistor 22 is turned off, and thus the latching transistor 24 is turned off.

Because the turn ratio of the coil portion between the tap point 23f and the fourth terminal 23d to the primary coil 31 is remarkably smaller than the turn ratio of the entire secondary coil 32 to the primary coil 31, it is possible to tap out a comparatively large current from the tap point 23f. Therefore, even when the voltage from the battery 21 is lowered, for example due to a low ambient temperature, a sufficiently large base current enough for activating the stopping transistor 38 may be supplied to the base of the stopping transistor 38. Thus, the reliability of automatic stopping of the oscillation transistor 22 is improved.

As well-known in the art, the conductivity of semiconductor elements varies depending upon their temperatures. Concerning Zener diodes, the Zener voltage increases or decreases with a temperature increase depending upon a set Zener voltage that is determined under a reference temperature. Specifically, those Zener diodes whose set Zener voltage is less than 5 to 6 volts have a negative temperature coefficient each, so the actual Zener voltage decreases with the temperature increase. On the contrary, those Zener diodes whose set Zener voltage is more than 5 to 6 volts have a positive temperature coefficient each, so the actual Zener voltage increases with the temperature increase.

The Zener voltage Vz also varies according to the variation in circumferential temperature as well as the temperature change due to heat in the Zener diode 37. As the Zener voltage Vz is set to be 10V in this instance, the Zener diode 37 has a positive temperature coefficient, so the actual Zener voltage Vz goes up as the temperature goes up. Without any temperature compensation, the Zener diode 37 would start conducting the Zener current when the voltage Vb–Va goes up above the given voltage Von, i.e. until the main capacitor 41 has been charged up to a value more than the set value.

However, those diodes which are used for rectifying have negative temperature coefficients. Therefore, as the temperature increases, the voltage drop through the rectifying diode 36 decreases, and thus the voltage applied to the Zener diode 37 increases. Therefore, the negative temperature coefficient of the rectifying diode 36 is designed to compensate for the positive temperature coefficient of the Zener diode 37. That is, the total temperature coefficient of the diodes 36 and 37 is approximately zero. In this way, the Zener current begins to flow at the set charge voltage of the main capacitor 41, regardless of the temperature variations.

The current from the booster section 20 is charged in the main and triggering capacitors 41 and 44. When the main capacitor 41 is charged up to its set charge voltage of 300V, the neon lamp 43 starts lighting. The light from the neon lamp 43 is conducted through a not-shown light guide or the like to the indication window near the eyepiece, so that the photographer can see that the flash device is ready to flash.

The trigger switch 46 is turned on when a shutter blade is opened up. Then, the triggering capacitor 44 discharges current to a primary coil 45a of the triggering transformer 45. As a result, a high voltage trigger voltage, e.g. 4KV, is induced in a secondary coil 45b of the transformer 45, which is applied to the triggering electrode 42a. The high voltage ionizes Xenon gas in the flash discharge tube 42 to break the resistance between its electrodes, so that the main capacitor 41 discharges, causing the flash discharge tube 42 to flash.

The recharging capacitor 27 of the booster section 20 is charged with the secondary current of the secondary coil 32, in the same way as the main capacitor 41. The charge loaded in the recharging capacitor 27 is discharged when the flash discharge tube 42 flashes, and flows into the base of the oscillation transistor 22, so that the oscillation transistor 22 is turned on to restart charging the main capacitor 41.

Now, the operation of the above described embodiment will be described. First the photographer rotates the film winding wheel 16 of the film unit 10 to wind up the filmstrip by one frame and also cock the shutter. If a flash photography is needed, the charge button 19 is depressed to turn on the flash charge switch 26. The photographer can quit depressing the charge button 19 as soon as it is fully depressed.

When the flash charge switch 26 is turned on, the base current is applied to the oscillation transistor 22 through the resistor 34a and the tertiary coil 33. Thereby, the oscillation transistor 22 is activated to conduct the collector current as much as the base current. As the collector current flows from the second terminal 23b through the primary coil 31 to the first terminal 23a, the collector current is equal to the primary current.

Because of the primary current, the electromotive force of the high voltage is generated in the secondary coil 32, so that the secondary current flows from the fifth terminal 23e to the fourth terminal 23d. The secondary current flows into the base of the oscillation transistor 22, so that the base current increases. As the base current increases, the collector current, i.e. the primary current through the primary coil 31 increases.

When the oscillation transistor 22 is turned on, the current flowing to the collector of the oscillation transistor 22 is also applied to the base of the latching transistor 24, so that the latching transistor 24 is turned on. Then, the voltage of the battery 21 begins to be applied to the base of the oscillation transistor 22 through the resistor 34a and the tertiary coil 33.

Because of the positive feedback from the oscillation transformer 23, the base current of the oscillation transistor 22 and the collector current of the oscillation transistor 22 increase concurrently. But as the oscillation transistor 22 is being saturated, the collector current is getting less increase. Thereby, the change in the primary current becomes smaller, and back electromotive forces are generated in the respective coils 31 to 33 of the oscillation transformer 23. Due to the back electromotive force, the current flowing from the secondary coil 32 to the base of the oscillation transistor 22 drops down. Thus, the collector current of the oscillation transistor 22 drops down.

However, because the latching transistor 24 applies the base voltage of the oscillation transistor 22, the oscillation transistor 22 is not completely turned off. After the back electromotive force on the oscillation transformer 23 stops, the base voltage from the latching transistor 24 causes the collector current of the oscillation transistor 22 to increase again. Accordingly, the primary current begins to increase again. In this way, even after the flash charge switch 26 is turned off, the oscillation transistor 22 or the blocking oscillator continues to oscillate.

The secondary current is generated by the electromotive force of the high voltage induced in the secondary coil 32 during the oscillation. Among the secondary current, those flowing in the direction from the fifth terminal 23e to the fourth terminal 23d are supplied through the charge current rectifying diode 25 to the charging-discharging section 40, and is charged in the main capacitor 41 and the triggering capacitor 44. Simultaneously, the recharging capacitor 27 is charged with this secondary current.

On the assumption that the ground potential GND at the minus pole of the battery 21 is a reference level (=0V), the potential level Vb at the fourth terminal 23d is maintained at a constant level that is higher than the ground potential GND by the base-emitter voltage of the oscillation transistor 22 while the electromotive force is generated on the oscillation transformer 23 in the first stage of charging when the charge voltage is around 0V, as shown in FIG. 5A. While the back electromotive force is generated, the potential level Vb at the fourth terminal 23d drops down like a pulse.

The potential level Va at the tap point 23f is maintained constant while the electromotive force is generated, and jumps up like a pulse while the back electromotive force is generated. In either phase, the potential level Va is higher than the potential level Vb at the fourth terminal 23d. Therefore, in the first stage of charging, the potential difference Vb–Va is applied across the rectifying diode 36 in the opposite direction, so that no current flows to the Zener diode 37 and thus to the base of the stopping transistor 38, so the stopping transistor 38 is not turned on.

As the main capacitor 41 is charged, the voltage across the main capacitor 41 increases. In this embodiment, the main capacitor 41 is designed to be charged in the negative direction, the positive terminal of the main capacitor 41 is maintained 0V, and the potential level at the negative terminal of the main capacitor 41 goes down. As a result, the load on the secondary coil 32 increases, so that the secondary current decreases, and the voltage of the electromotive force and that of the back electromotive force on the secondary coil 32 go down. In addition, the oscillation frequency of the blocking oscillator goes up.

As the cycle of change in the potential level Va is getting shorter, the potential level Va goes down as the whole. On the other hand, the potential level Vb at the fourth terminal 23d changes between the same levels as in the first stage of charging, even through the cycle of change is getting shorter in the same way as the potential level Va. Consequently, the potential level Va goes below the potential level Vb while the electromotive force is generated, so that the voltage starts to be applied across the Zener diode 37. However, until the charge voltage of the main capacitor reaches the set value, the potential difference Vb–Va is less than the given voltage Von, so the voltage applied to the Zener diode 37 is less than the Zener voltage Vz. Therefore, the Zener diode 37 does not conduct the Zener current, and the stopping transistor 38 is not turned on until the main capacitor 41 is charged up to the set charge voltage. In this way, the oscillation transistor 22 continues to oscillate until the main capacitor 41 is charge up to the set charge voltage.

Figure 3A:
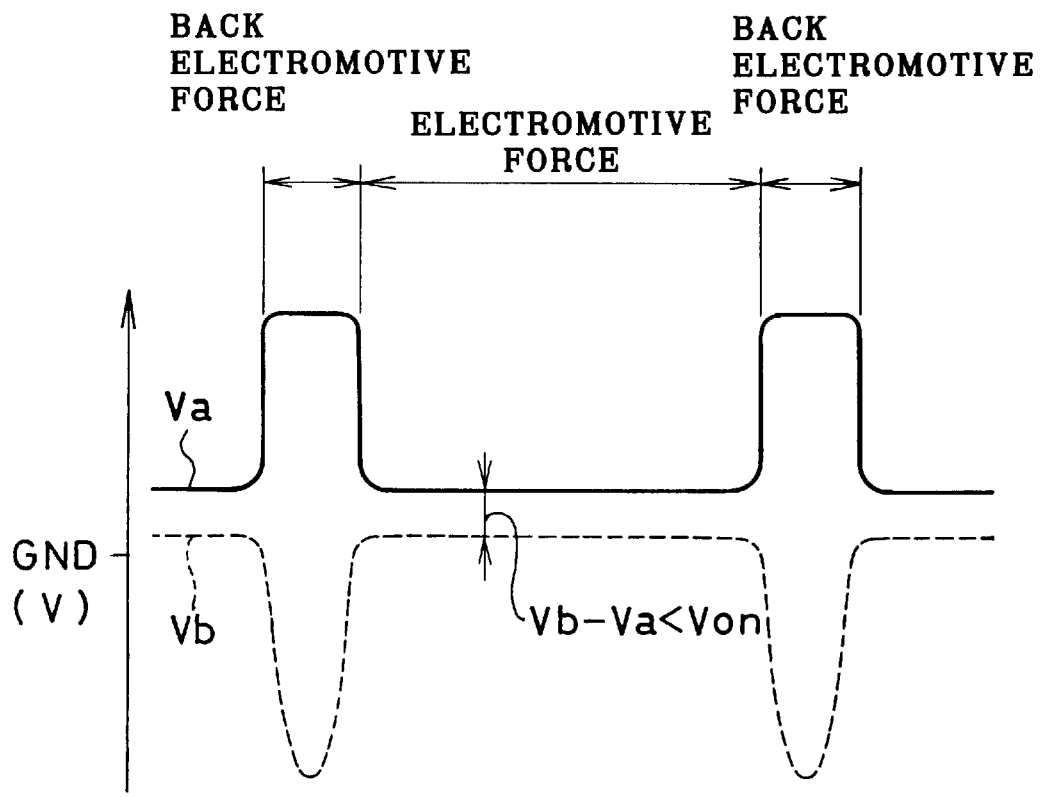
FIGS. 3A and 3B are timing charts illustrating the operation of the flash device of the first embodiment.
Figure 3B:
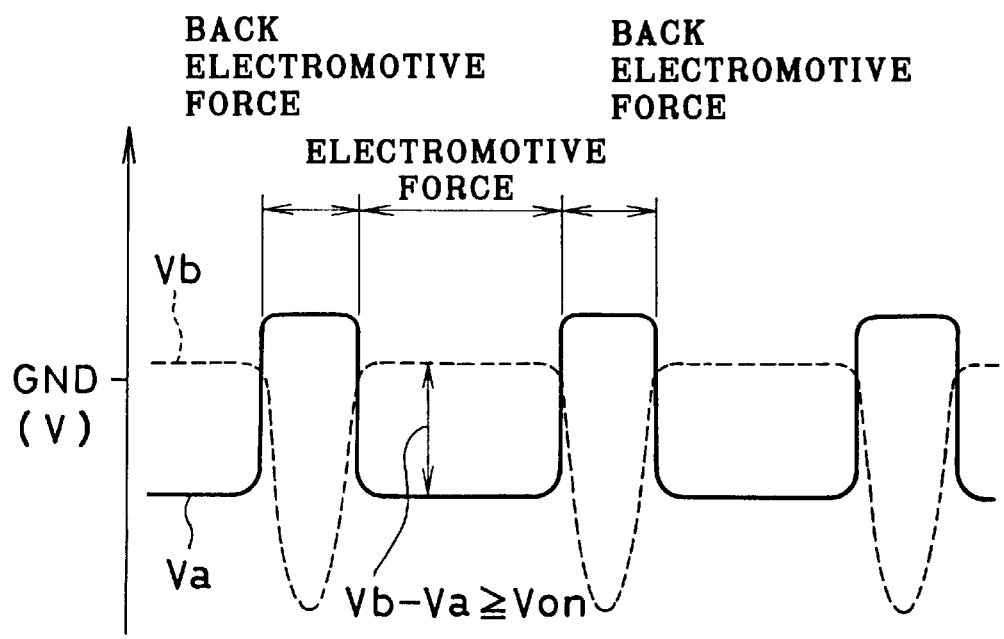

When the main capacitor 41 is charged up to the set voltage, i.e. 300V in this embodiment, the potential difference or voltage Vb–Va comes to the given voltage Von, i.e. 10.6V, as shown in FIG. 3B, while the electromotive force is generated. Then, the Zener voltage Vz is applied across the Zener diode 37 through the rectifying diode 36, so that the Zener current flows through the Zener diode 37. Because of the Zener current, a current flows from the fourth terminal 23d to the base of the stopping transistor 38, turning on the stopping transistor 38. Indeed the voltage Vb–Va varies according to the oscillation of the blocking oscillator, it is rectified and smoothed through the rectifying diode 36 and the smoothing capacitor 39 before being applied to the Zener diode 37, it is possible to stably turn on the stopping transistor 38.

When the stopping transistor 38 is turned on, the base of the oscillation transistor 22 is connected to the emitter thereof through the stopping transistor 38, so that the oscillation transistor 22 is turned off. When the oscillation transistor 22 is turned off, the base current of the latching transistor 24 stops, so that the latching transistor 24 is turned off. Then, the oscillation transistor 22 does not continue to oscillate, thereby stopping charging the main capacitor 41. When the charging stops, the stopping transistor 38 is turned off. Even when the stopping transistor 38 is turned off, the oscillation transistor 22 cannot restart oscillating.

Beside that, the neon lamp 43 starts lighting when the main capacitor 41 is charged up to the set voltage, so the photographer can see that the flash device is ready to flash. Then, the photographer can depress the shutter button 18 to make the flash photography while framing through the viewfinder.

When the shutter button 18 is depressed, the shutter is activated, and the triggering switch 46 is turned on the moment the shutter is fully opened. Upon the triggering switch 46 being turned on, the triggering capacitor 44 discharges, so that the current flows through the primary coil 45a of the triggering transformer 45, inducing the triggering voltage across the secondary coil 45b. The triggering voltage is applied through the triggering electrode 42a to the flash discharge tube 42. Then, the main capacitor 41 is discharged through the flash discharge tube 42, causing the flash discharge tube 42 to flash. Then the flash projector 17 projects light to accomplish the flash photography.

Because of the mutual temperature compensation effect of the Zener diode 37 and the rectifying diode 36, the main capacitor 41 is charged up to the set voltage without any variation in the charge voltage. Therefore, the flash photography is always carried out with an approximately constant amount of flashlight.

Simultaneously with the flash discharge tube 42 emits light, the recharging capacitor 27 is discharged through the flash discharge tube 42. The discharged current from the recharging capacitor 27 flows into the base of the oscillation transistor 22. Thereby, the oscillation transistor 22 is reactivated. When the oscillation transistor 22 is reactivated, the latching transistor 24 is turned on just like when the flash charge switch 26 is turned on for a moment. The latching transistor 24 makes the oscillation transistor 22 continue oscillating. In this way, the main capacitor 41 restarts being charged.

Now a flash circuit according to a second embodiment will be described, whose fundamental configurations are equivalent to those of the first embodiment, wherein like reference numerals designate like or corresponding parts. The following description merely relates to those portions essential to the second embodiment.

Figure 4:
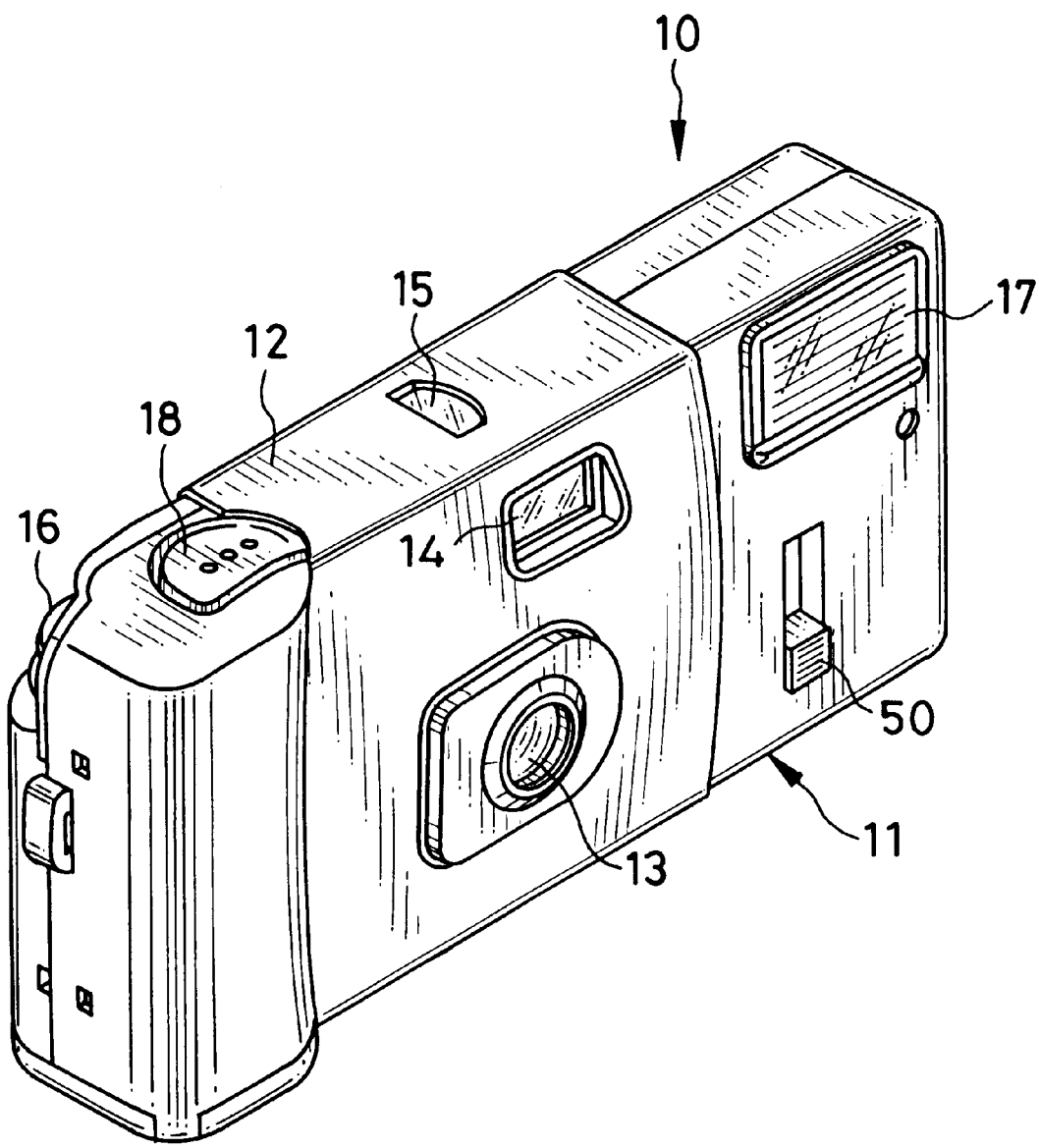
FIG. 4 is a perspective view of a lens-fitted film unit with a flash device according to a second embodiment of the invention.

A film unit 10 shown in FIG. 4 is provided with a charging operation member 50 that is slidable between an ON position and an OFF position. Setting the charging operation member 50 in the ON position causes a flash device to start charging a main capacitor 41 up to a set voltage, e.g. 300V. So long as the charging operation member 50 is maintained in the ON position, the main capacitor 41 is intermittently charged up to the set voltage for supplement natural discharge. The charging operation member 50 is also used for selecting whether a flash light is to be projected or not. That is, when the charging operation member 50 is in the ON position, the flash light is projected during the exposure. But when the charging operation member 50 is in the OFF position, the flash light is not projected even if the main capacitor 41 is fully charged.

Figure 5:
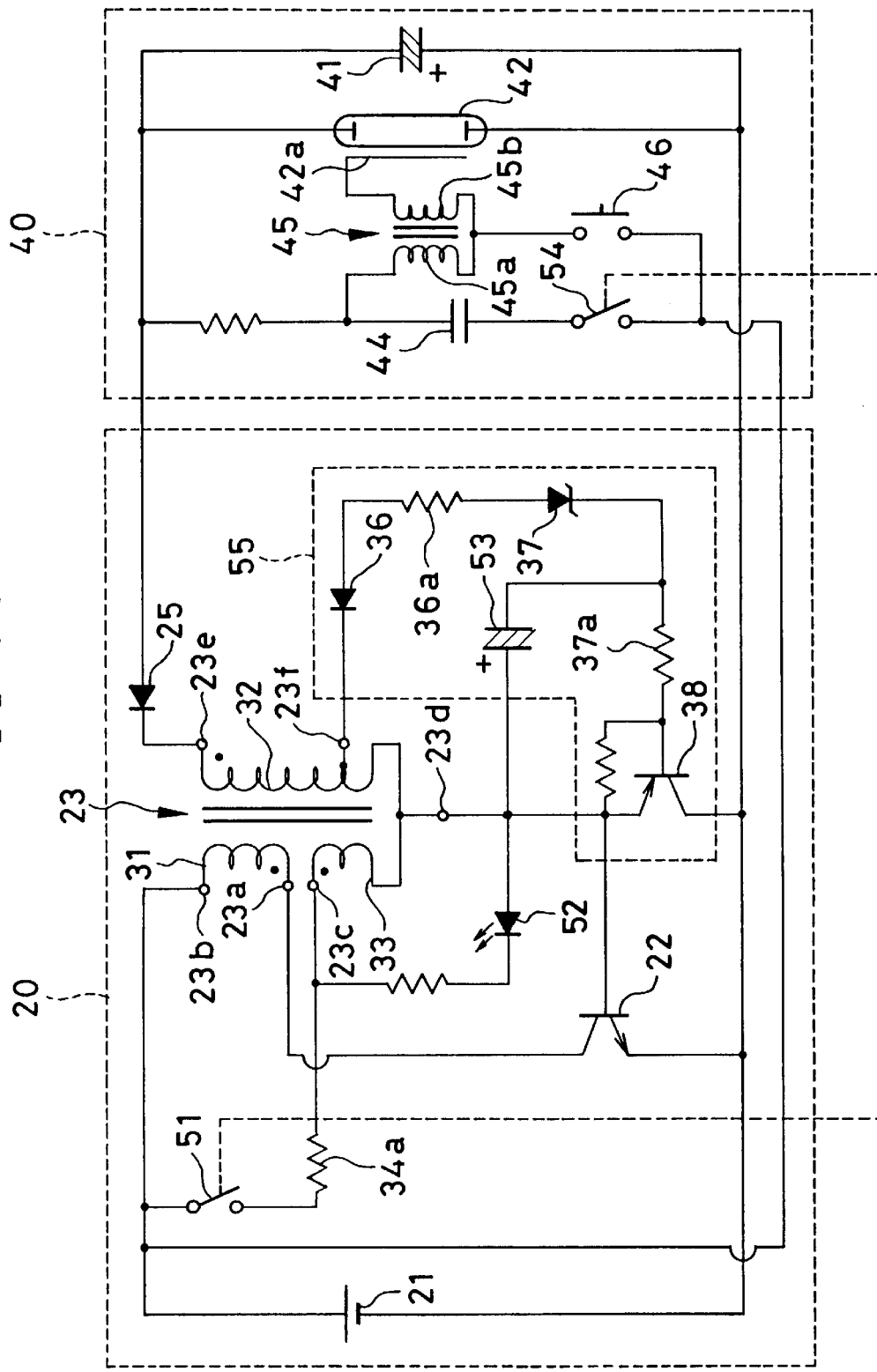
FIG. 5 is a circuit diagram of the flash device according to the second embodiment of the invention.
Figure 10:
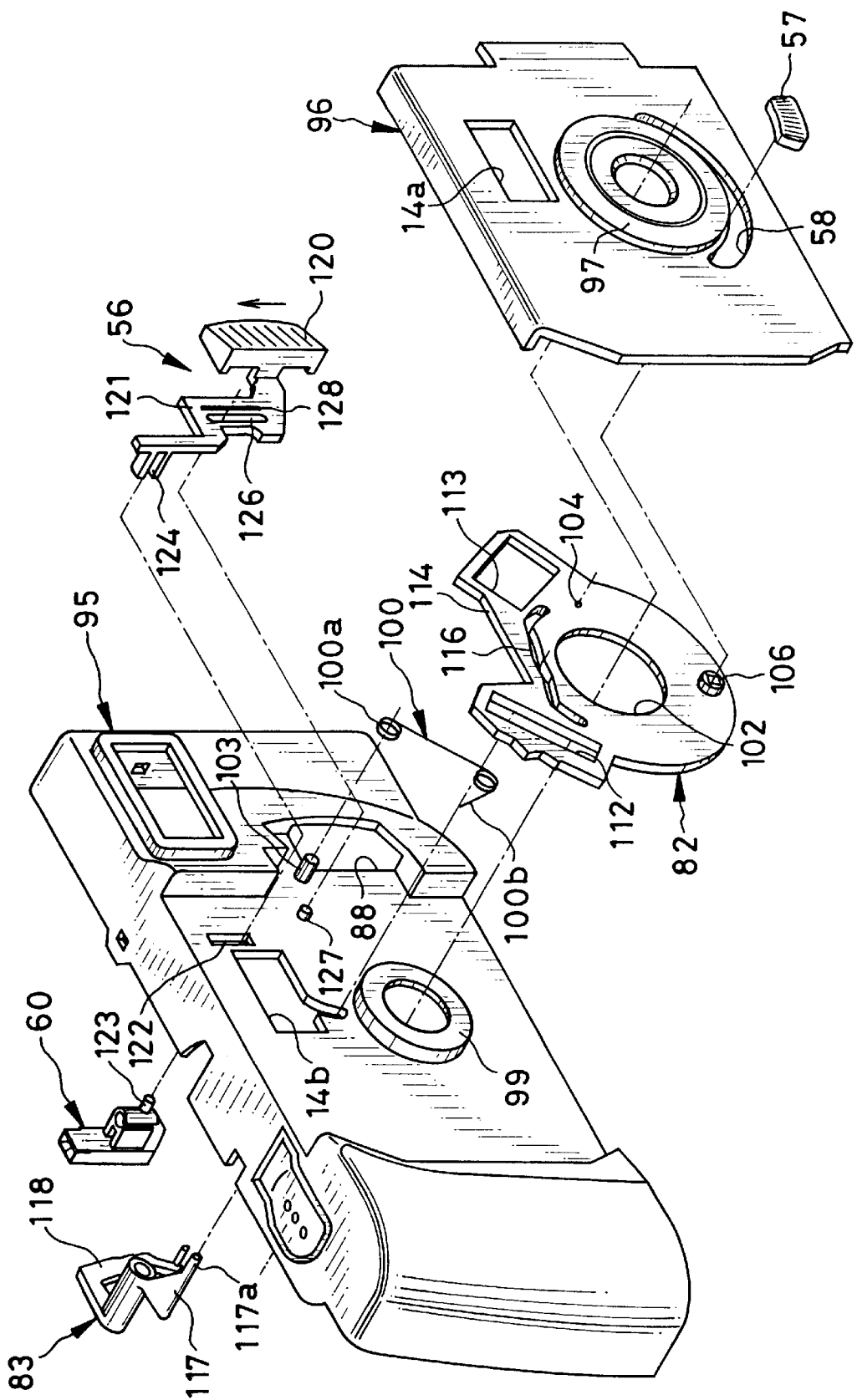
FIG. 10 is an exploded perspective view of a front cover of the lens-fitted photo film unit of FIG. 7.

FIG. 5 shows the flash circuit provided in the film unit of FIG. 10. A booster section 20 is provided with a flash charge switch 51 that is turned on while the charging operation member 50 is in the ON position, or off while the charging operation member 50 is in the OFF position. Unlike the above embodiments, the booster section 20 does not have a latching transistor 24, a looping diode 28, a recharging capacitor 27 and a smoothing capacitor 39. When the flash charge switch 51 is turned on, a current flows into the base of an oscillation transistor 22, so that the oscillation transistor 22 oscillates, and the main capacitor 41 is charged with a high voltage generated through an oscillation transformer 23. That is, a blocking oscillator consisting of the oscillation transistor 22 and the oscillation transformer 23 operates while the flash charge switch 51 is in the ON state.

Instead of a neon lamp, a light emission diode (LED) 52 is connected between a third terminal 23c and a fourth terminal 23d of the oscillation transformer 23, for indicating completion of charging of the main capacitor 41. Anode of the LED 52 is connected to the fourth terminal 23d such that the LED 52 starts lighting when the main capacitor 41 is charged up to the set voltage. Detail of the LED 52 is disclosed in JPA 8-115796.

An oscillation stopping circuit 55 includes a rectifying diode 36 connected in series to a tap point 23f of a secondary coil 32, resistors 36a and 37a, a Zener diode 37 and a stopping transistor 38, in the same way as the above embodiment, but also includes a stopping capacitor 53. Also in this embodiment, the rectifying diode 36 and the Zener diode 37 constitute a mutual temperature compensating circuit.

Since the flash charge switch 51 is maintained in the ON state when to charge the main capacitor 41, if the stopping transistor 38 is turned on only for a short time, the oscillation transistor 22 cannot always be deactivated. To make sure that the oscillation transistor 22 stops oscillating when the main capacitor 41 is charged up to the set voltage, the stopping capacitor 53 is connected directly between cathode of the Zener diode 37 and the fourth terminal 23d of the oscillation transformer 23. When the main capacitor 41 is charged up to the set voltage, a Zener current flows through the Zener diode 37, in the same way as described with respect to the second embodiment of FIG. 4. But the Zener current flows through the stopping capacitor 53 in the direction from the fourth terminal 23d to the tap point 23f, so that the stopping capacitor 53 is charged with the Zener current directly, that is, without any intermediate resistor. Therefore, the stopping capacitor 53 is charged up to an appropriate full voltage in a moment, e.g. about 10 ms (micro seconds).

Figure 6:
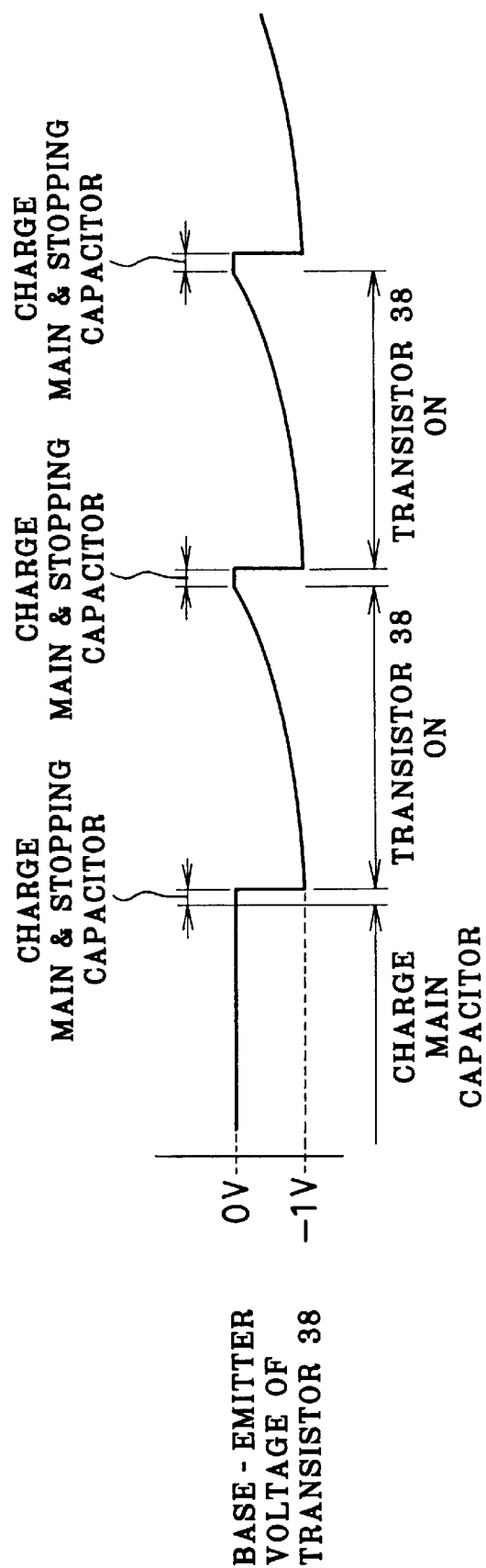
FIG. 6 is a signal chart illustrating the charging operation of the flash device of the second embodiment.

As shown in FIG. 6, as the Zener current flows through the stopping capacitor 53 immediately after the charge voltage of the main capacitor 41 reaches the set value, the base-emitter voltage of the stopping transistor 38 comes to zero volt, so that the stopping transistor 38 is not turned on. When the stopping capacitor 53 is charged up, the charge voltage of the stopping capacitor 53 is applied across the base-emitter circuit of the stopping transistor 38, so that the circuit from the stopping capacitor 53 through the base and the emitter of the stopping transistor 38 to the resistor 37a is closed, and thus the stopping capacitor 53 discharges. The discharged current flows in the base of the stopping transistor 38, thereby turning on the stopping transistor 38. As a result, a current that has been applied from a battery 21 to the base of the oscillation transistor 22 through the flash charge switch 51 begins to flow through the emitter-collector circuit of the stopping transistor 38, so that the oscillation transistor 22 is deactivated, and the charging the main capacitor 41 is terminated.

Discharging through the resistor 37a is for supplying the base current of the stopping transistor 38 for a longer time. As long as the base current is supplied, the stopping transistor 38 is turned on. Consequently, the stopping transistor 38 is turned on for the longer time enough to stop the oscillation transistor 22 from oscillating. The ON-period of the stopping transistor 38 may be set by adjusting time coefficient that is determined by the capacitance of the stopping capacitor 53 and the resistance of the resistor 37a. In this embodiment, the capacitance of the stopping capacitor 53 is 47 $\mu$F, and the resistance of the resistor 37a is 10KΩ, whereby the ON-period of the stopping transistor 38 is set to be 0.3 seconds in actual measurement. According to this configuration, the oscillation transistor 22 stops oscillating at least for 0.3 seconds, even while the flash charge switch 51 is in the ON state.

As the stopping capacitor 53 discharges, the charge voltage of the stopping capacitor 53 goes down. When the charge voltage of the stopping capacitor 53 goes below a predetermined value, the stopping transistor 38 is turned off. So long as the flash charge switch 51 is in the ON state, the current from the battery 21 restarts flowing into the base of the oscillation transistor 22, so that the oscillation transistor 22 restarts oscillating. Since the main capacitor 41 has already been charged up to the set voltage, the Zener current flows through the Zener diode 37 as soon as the oscillation restarts. As the stopping capacitor 53 is charged with the Zener current soon to the full and then starts discharging, the stopping transistor 38 is turned on by the discharged current in short time after the restart of oscillation. Thus, charging the main capacitor 41 is terminated soon.

In the same way as above, the stopping transistor 38 is turned on and off repeatedly, so that the oscillation transistor 22 stops and restarts oscillating repeatedly. Therefore, so long as the flash charge switch 51 is in the ON state, the main capacitor 41 is charged repeatedly and intermittently to supplement the natural discharge of the main capacitor 41, and thereby to maintain the charge voltage of the main capacitor 41 approximately constant.

In a charging-discharging section 40, a terminal of a triggering capacitor 44 and a common terminal of primary and secondary coils 45a and 45b are connected to a pulse pole of the battery 21, and a flash selection switch 54 is connected in series to the triggering capacitor 44. The flash selection switch 54 is turned on or off in cooperation with the flash charge switch 51 being turned on or off by setting the charging operation member 50 to the ON position, or to the OFF position, respectively.

According to this configuration, when the flash selection switch 54 is in the ON state, the triggering capacitor 44 is charged with the current from the booster section 20, and is discharged upon a triggering switch 46 being turned on. Then a triggering voltage is applied to a flash discharge tube 42. Even while the main capacitor 41 is fully charged, if the flash selection switch 54 is in the OFF state, the triggering capacitor 44 could not discharge, so that no flash light is projected.

As the main capacitor 41 is being charged, the potential at the third terminal 23c goes down gradually. Finally, the potential at the third terminal 23c becomes less than the potential at the fourth terminal 23d in the phases when back electromotive forces are not generated. Then, the voltage is applied across the LED 52 in its forward direction. In this embodiment, when the charge voltage in the main capacitor 41 goes above 250V, the potential difference between the third and fourth terminals 23c and 23d becomes so large that the LED 52 emits light at a visible intensity. When the main capacitor 41 is charged up to the set voltage of 300V, the potential difference between the third and fourth terminals 23c and 23d becomes large enough for the LED 52 to emit light at a predetermined high intensity.

The LED 52 stops lighting while the stopping transistor 38 is turned on. Therefore, the intermission interval of the LED 52 is defined at the same time as the ON-period of the stopping transistor 38 is defined by adjusting the time coefficient that is determined by the capacitance of the stopping capacitor 53 and the resistance of the resistor 37a. If, for example, an LED is provided in a flash circuit where a stopping transistor is turned on directly by the Zener current, the intervals of intermission of lighting of the LED could vary largely due to variations in the circumferential temperature, in the leak current from a main capacitor, in the performance of the individual Zener diode, and so on. According to the configuration of FIG. 5, the LED 52 can emit light at regular intervals.

It is possible to provide the same stopping capacitor as above in the flash circuit of FIG. 2 between the cathode of the Zener diode 37 and the fourth terminal 23d. Thereby, the stopping transistor 38 will not be affected by electric noises that might be caused when the main capacitor 41 is almost charged up to the set voltage, and will be turned on for a sufficiently long time enough to stop charging the main capacitor 41.

The oscillation stopping circuit 55 using the stopping capacitor 53 is preferably applicable to a flash circuit which needs to keep pushing a charge button to continue charging. Although the above described embodiments charge the main capacitor in the negative direction, the present invention is applicable to those flash circuits whose main capacitor is charged in the positive direction. In that case, the potential of a tap point at an intermediate position of a secondary coil of an oscillation transformer increases as the charge voltage in the main capacitor increases. Accordingly, a rectifying diode and a Zener diode should be connected in the opposite polarity to the above embodiments between the tap point and the base of a stopping transistor.

In those types of flash device where the flash device repeats charging so long as the flash charge switch is turned on, like the embodiment shown in FIG. 4, if the photographer inadvertently leave the charging operation member in the ON position, the battery can run down and the flash photography becomes impossible before all of the available picture frames have been photographed. This will be prevented if only the photographer checks the position of the charging operation member or the indication light for indicating completion of charging, at the conclusion of photography. However, where the switching condition of the charging operation member is not apparent or the indication light indicating the completion of charging is not conspicuous, the photographer can fail to reset the charging operation device to the OFF position. This trouble is more likely to occur when the photographer is unfamiliar with the film unit. The following embodiment is effective to prevent the photographer from forgetting to turn off the flash charge switch.

Figure 7:
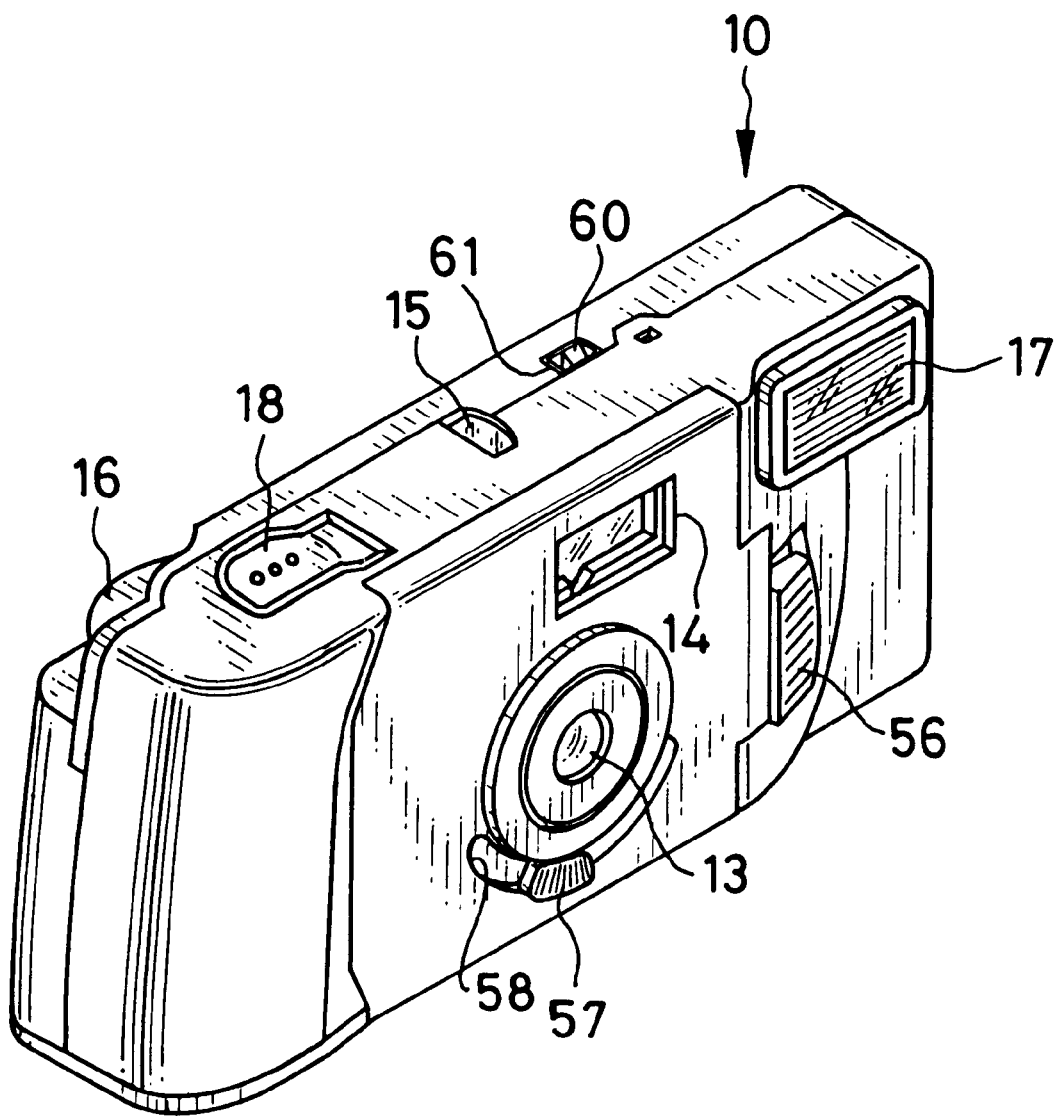
FIG. 7 is a perspective view of a lens-fitted photo film unit with a flash device according to a third embodiment of the invention, in a state where the flash device is not used.
Figure 8:
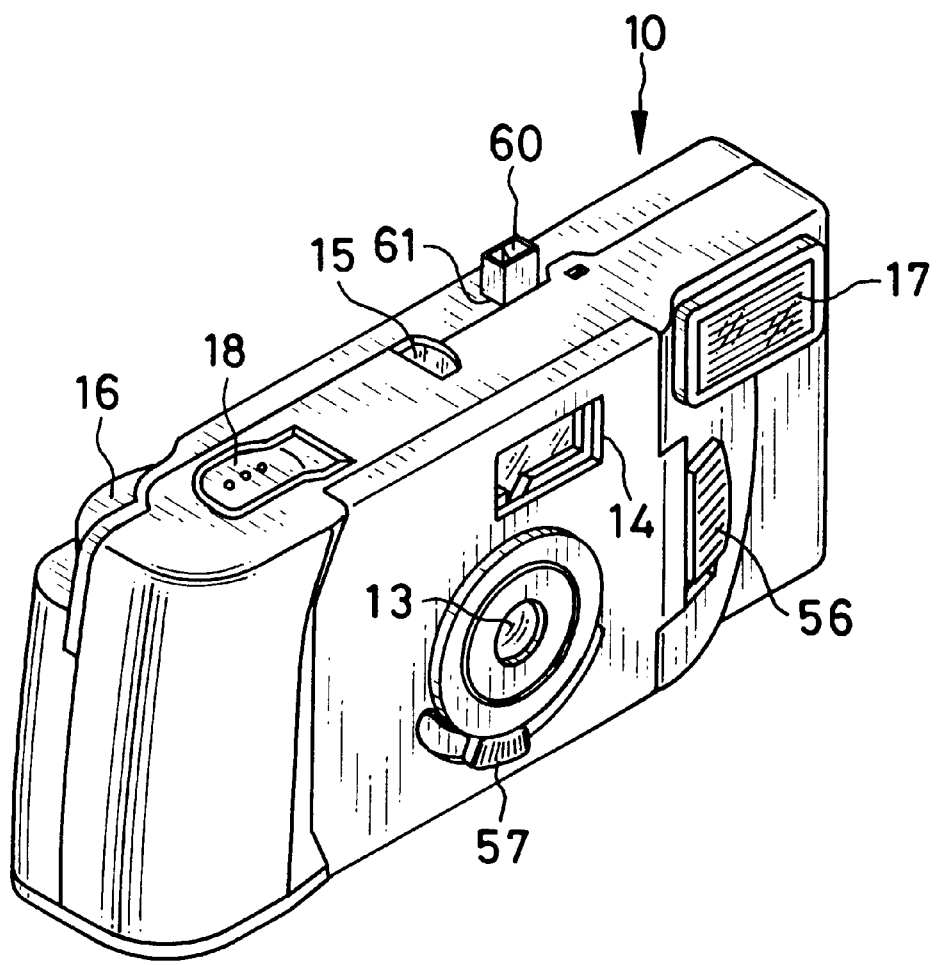
FIG. 8 is a perspective view of the lens-fitted photo film unit of FIG. 7 in a state where the flash device is used.

FIG. 7 shows an outer appearance of the film unit 10 in a condition where no flash light is projected. In a front side of the film unit 10, there are a taking lens 13, a finder objective window 14, a flash projector 17, a charging operation member 56, and a view changing knob 57. On a top side of the film unit 10, there are a shutter button 18, a frame counter window 15, and an opening 61 through which a charge condition indicator 60 can come out as shown in FIG. 8. On a rear side of the film unit 10, there are a film winding wheel 16, a finder eyepiece window 14c and other elements, as shown in FIG. 9.

The charging operation member 56 is slidable in a vertical direction between an OFF position shown in FIG. 7 and an ON position shown in FIG. 8. The charging operation member 56 is slid up to the ON position for charging a built-in flash device 70, or down to the OFF position for not charging the flash device 70. When the charging operation member 56 is set to the ON position, the charge condition indicator 60 pops up through the opening 61 as shown in FIG. 8. The charge condition indicator 60 starts lighting when the flash device 70 completes charging. The view changing knob 57 is provided below the taking lens 13 so as to be slidable along an arcuate slot 58 around the taking lens 13.

Figure 9:
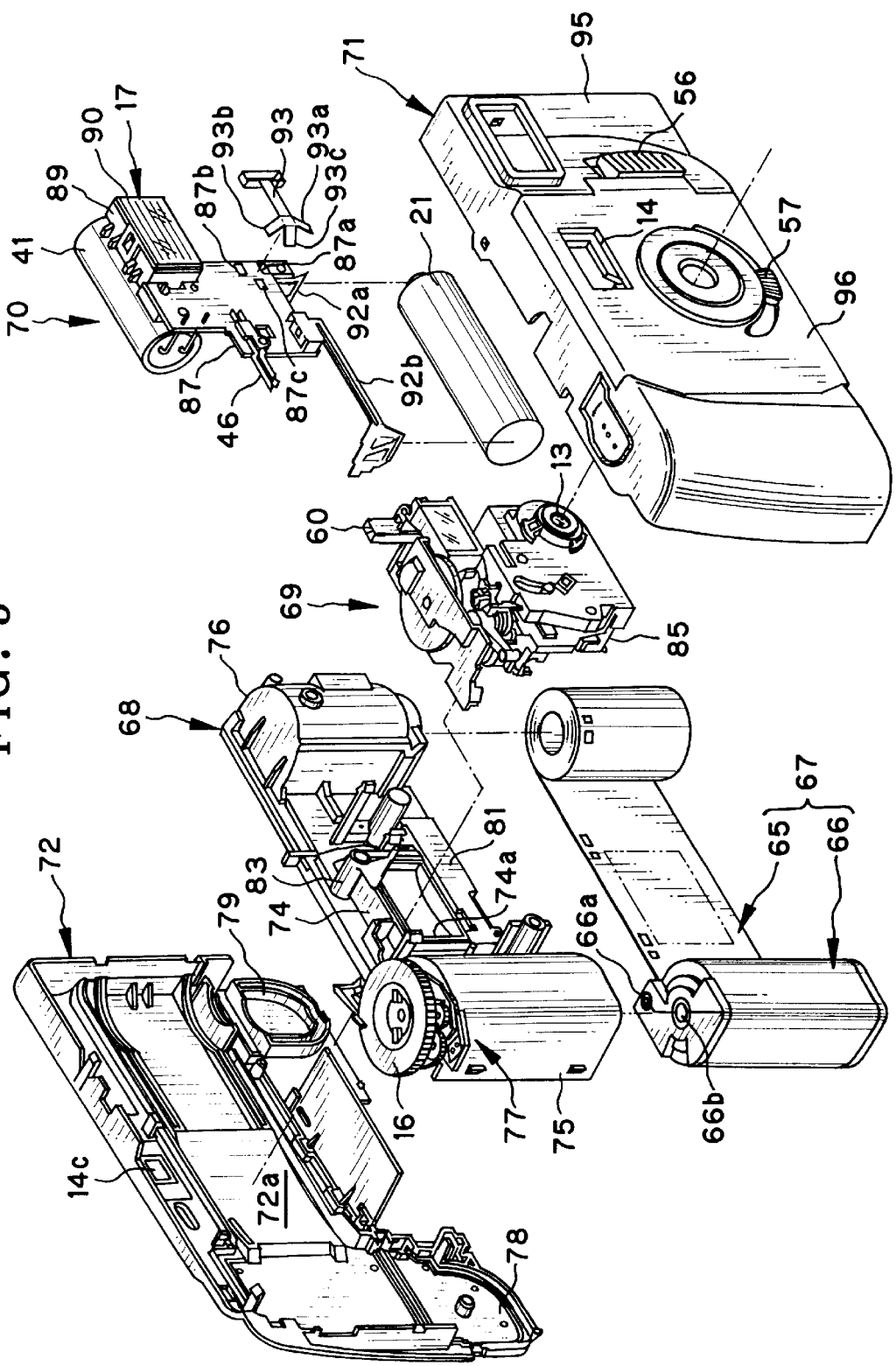
FIG. 9 is an exploded perspective view of the lens-fitted photo film unit of FIG. 7.

As shown in FIG. 9, the unit main body 3 is constituted of a basic portion 68 containing a photo film cartridge 67, an exposure unit 69 and the flash device 70, which are attached to the front of the basic portion 68, a front cover 71 covering the front of the basic portion 68, and a rear cover 71 covering the rear of the basic portion 68. These components are assembled by snap-in engagement.

The basic portion 68 has an exposure chamber 74 in its center portion, and a cartridge chamber 75 and a film roll chamber 76 holding respectively a cartridge shell 66 and a roll of unexposed filmstrip 65 on opposite sides of the exposure chamber 74, which are formed as an integral body. The exposure chamber 74 has an exposure aperture 74a defining a frame exposure range on the filmstrip 65. In this embodiment, the film cartridge 67 is of IX 240 type, so the frame exposure range is of a high-vision size (aspect ratio 1.8).

The rear cover 72 closes the cartridge chamber 75 and the film roll chamber 76 from the rear side, and bottom lids 78 and 79 formed integrally with the rear cover 71 close bottoms of the chambers 75 and 76 in a light-tight fashion. The rear cover 72 further has a film supporting surface 72a for backing the filmstrip 65 placed behind the exposure aperture 74a.

Atop the cartridge chamber 75 are mounted the film winding wheel 16 and a light-shielding lid closing mechanism 77. The film winding wheel 16 and the light-shielding lid closing mechanism 77 are engaged with a spool 66b and a light-shielding lid 66a of the cartridge shell 66 through a top wall of the cartridge chamber 76. The light-shielding lid closing mechanism 77 closes the light-shielding lid 66a when the cartridge shell 66 is removed from the film unit 10 after the whole length of the filmstrip 65 is wound up into the cartridge shell 66.

The exposure unit 69 is constituted of a shutter charge mechanism, a shutter release mechanism, a film winding-stopping mechanism, a frame counting mechanism, the taking lens 13 and viewfinder optical system 111a and 111b (see FIG. 12) and other elements necessary for exposure, which are mounted to a base block portion 85. The exposure unit 69 is attached to the front of the exposure chamber 74.

The flash device 70 is constituted of a circuit board 87 having contact chips 87a, 87b and 87c printed thereon, the flash projector 17, a main capacitor 41, a synchronizing switch 46, a pair of contact strips 92a and 92b for a battery 21, a metal contact blade 93 and other elements constituting a flash circuit. The metal contact blade 93 is placed in front of the film roll chamber 76 such that the metal contact blade 93 is brought into contact with the contact chips 87a to 87c when the charging operation member 56 is set to the ON position. Thereby the flash circuit starts charging the main capacitor 41. The flash projector 17, which is mainly constituted of a flash discharge tube 42 (see FIG. 11), a holder 89 for holding the flash discharge tube 42, and a diffusion plate 90 for diffusing light from the flash discharge tube 42, is mounted to the circuit board 87. The synchronizing switch 46 is turned on in cooperation with releasing operation of the shutter release mechanism of the exposure unit 69.

As shown in FIG. 10, the front cover 71 consists of a front cover main body 95 and a front panel 96 that is attached to the front of the front cover main body 95. The front cover main body 95 has an opening 14b that is substantially equal in shape and size to an opening 14a formed through the front panel 96, and is disposed in alignment with the opening 14a. The openings 14a and 14b constitute the finder objective window 14. The charging operation member 56 and a view changing plate 82 are mounted in between the front panel 96 and the front cover main body 95.

The view changing plate 82 has a round center hole 102 which is fitted on the lens barrel 99 so the view changing plate 82 is rotatable about an optical axis of the taking lens 13. The view changing plate 82 is urged by the toggle spring 105 to rotate either in a clockwise direction or in a counterclockwise direction. A coiled end 105a of the toggle spring 105 is fitted on a pin 103 that is formed on the front cover main body 95, and another end 100b of the toggle spring 105 is inserted in a small hole 104 of the view changing plate 82. A boss 106 is integrally formed on a lower front portion of the view changing plate 82. The boss 106 is inserted in the arced slot 58 that is formed under a lens hood 97 of the front panel 96. The view field switching knob 57 is attached from the front to the boss 106.

The view changing plate 82 has in its peripheral portions a panoramic size view window 112 (aspect ratio 3.0) and a conventional size view window 113 (aspect ratio 1.5), and a cutout 114 disposed between these windows 112 and 113. By operating the view changing knob 57 to rotate the view changing plate 82, one of the panoramic size view window 112, the conventional size view window 113 and the cutout 114 is placed in the finder objective window 14. In this film unit 10, every picture frame is recorded in the high-vision size, so that the finder objective window 14 and the finder eyepiece window 14c originally provide a high-vision size view field, and the high-vision size view field is provided when the cutout 114 is placed in the finder objective window 14. When the conventional size view window 113 is inserted in the finder objective window 14, the field of view is limited to the conventional size. When the panoramic view window 112 is inserted in the finder objective window 14, the field of view is limited to the panoramic size.

A cam slot 116 is formed in a peripheral range around the round hole 102. The cam slot 116 accepts a pin 117a which is formed on a tip of an arm 117 of a rotary lever 83 that is mounted above the exposure chamber 74. Thus, the rotary lever 83 rotates along with the movement of the view changing knob 57. Although it is not shown in detail in the drawings, there are provided below the exposure chamber 74 behind a light-shielding plate 81, a couple of data recording holes for photographically recording print format data on the filmstrip 65, a data switching plate for opening or closing one or both of the data recording holes, and a light guide for transmitting light from a data recording light emission element 136 (see FIG. 11) to the data recording holes. The data recording light emission element 136 is mounted to the flash device 70, and emits light upon each shutter release operation. Another arm 118 of the rotary lever 83 is coupled to the data switching plate, so that the data switching plate moves as the rotary lever 83 rotates with the rotation of the view changing plate 82. As a result, both or one of the two data recording holes is closed or opened, so that at most two dots are recorded as the print format data onto the filmstrip 65 outside the frame exposure area in accordance with the view field. In accordance with the print format data, a print of the same size as the view field, e.g. a panoramic size print, is made from the high-vision size picture frame.

Figure 11:
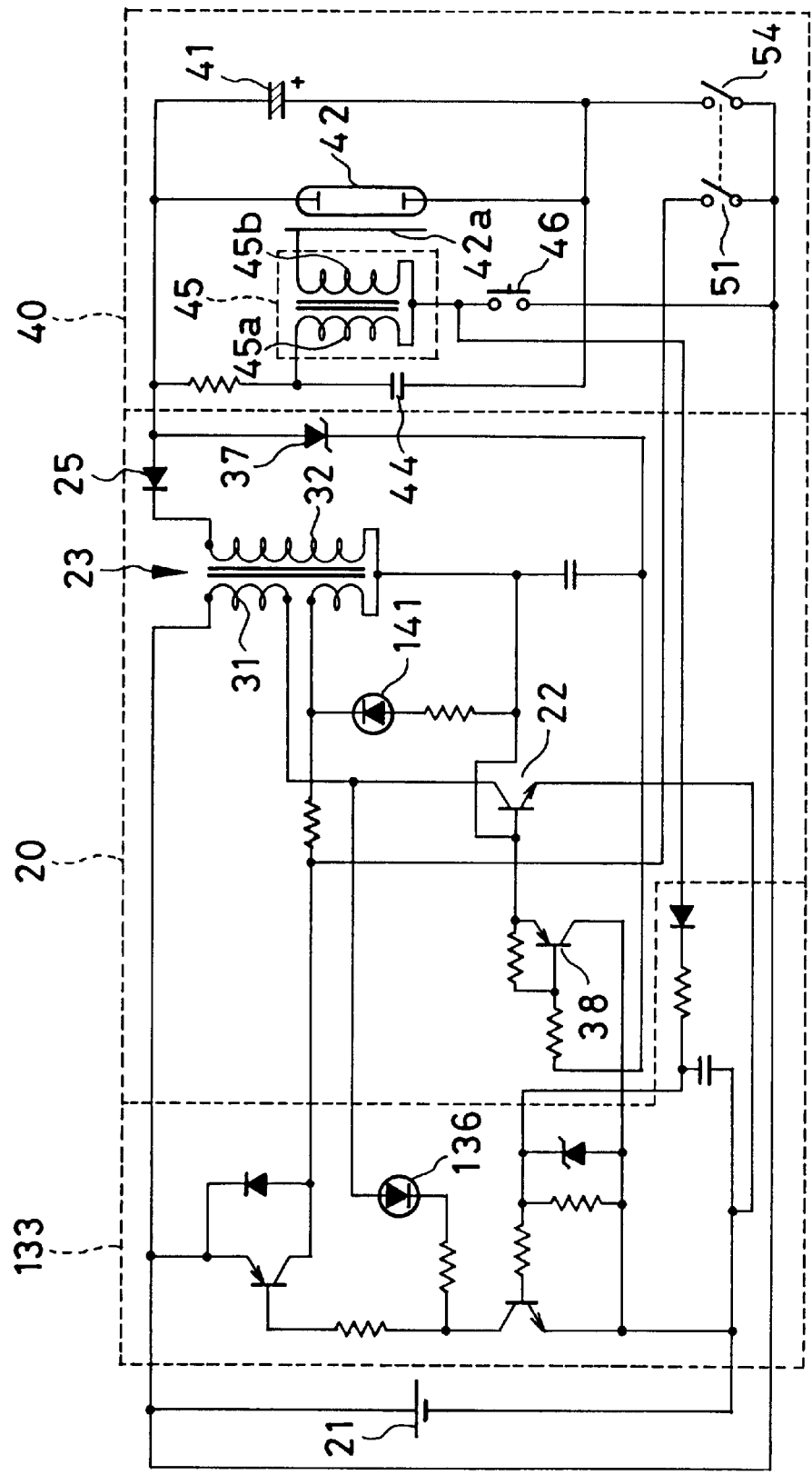
FIG. 11 is a circuit diagram of the flash device of the third embodiment.

FIG. 11 shows the flash circuit formed on the circuit board 87. The flash circuit is of the auto charging type like the embodiment shown in FIG. 5, and is mainly constituted of a recording lamp section 133 including the data recording light emission element 136, a booster section 20 and a charging-discharging section 40. The data recording light emission element 136 emits light each time the synchronizing switch 46 is turned on independently of the flash discharge tube 42.

The booster section 20 is constituted of the battery 21, an oscillation transistor 22, an oscillation transformer 23, a rectifying diode 25, a stopping transistor 38, and an indication light emission element 141 in fundamentally the same way as above embodiments. The charging-discharging section 40 also has fundamentally the same construction as the above embodiments, and is constituted of the main capacitor 41, the flash discharge tube 42, a triggering electrode 42a, a triggering capacitor 44, a triggering transformer 45, the synchronizing switch 46, a flash charge switch 51, a flash selection switch 54 and so forth. The main capacitor 41 is connected in parallel to the flash discharge tube 42, and is connected at its minus pole to a cathode of the rectifying diode 25.

The oscillation transistor 22 and the oscillation transformer 23 constitute a well-known blocking oscillator circuit which starts oscillating when the flash charge switch 51 is turned on. While the oscillation transistor 22 oscillates, an alternating current of a high voltage is induced across a secondary coil 32 of the oscillation transformer 23 in accordance with a turn ratio of the secondary coil 32 to a primary coil 31. The current from the secondary coil 32 is supplied to the charging-discharging section 40 through the rectifying diode 25.

The base of the stopping transistor 38 is connected to a Zener diode 37. The Zener diode 37 conducts a Zener current when the main capacitor 41 is charged up to a given voltage. The Zener current turns on the stopping transistor 38, thereby turning off the oscillation transistor 22. When the main capacitor 41 is charged up to the set voltage, the indication light emission element 141 begins to light.

The flash selection switch 54 opens or closes a discharging circuit that consists of the triggering capacitor 44, a primary coil 45a of the triggering transformer 45 and the synchronizing switch 46. The flash selection switch 54 is also connected to a charging circuit for charging the main and triggering capacitors 41 and 44. Accordingly, turning off the flash selection switch 54 prevents the triggering capacitor 44 from discharging and also prevents the main and triggering capacitors 41 and 44 from charging. The flash charge switch 51 and the flash selection switch 54 have a common minus terminal.

The above flash circuit restarts charging automatically after a flash light is projected so long as the flash charge switch 51 and the flash selection switch 54 are ON. Even after the main capacitor 41 is fully charged, if the flash charge switch 51 and the flash selection switch 54 are ON, the blocking oscillator circuit automatically restarts oscillating each time the voltage across the main capacitor 41 goes below the set charge voltage. Therefore, the main capacitor 41 is charged repeatedly, and the indication light emission element 141 emits light continually.

The charging operation member 56 has a button portion 120 that is exposed to the front of the front cover 71, a base plate 121 that is mounted to the front of the front cover main body 95, and an engaging portion 124 that is inserted in a vertical slot 122 formed through the front cover main body 95, and is engaged with a pin 123 formed on a front side of the charge condition indicator 60. The charging operation member 56 is thus slidable along the slot 122.

The base plate 121 has a vertical slit 126, which accepts a pin 127 that is formed on the front wall of the front cover main body 95. The slit 126 has not-shown two notches, so that the pin 127 clicks with either of the notches when the charging operation member 56 is slid up to the ON position or down to the OFF position. Thereby, the charging operation member 56 is held in the ON position or the OFF position. A narrow slit 128 is formed beside the slit 126 for giving a resiliency to the slit 126.

The button member 120 is disposed in front of the opening 88, and has a not-shown boss in its rear side. When the button member 120 is slid upward, the boss pushes the metal contact blade 93 through the opening 88. Then, contact tips 93a, 93b and 93c of the metal contact blade 93 are respectively brought into contact with the contact chips 87a, 87b and 87c formed on the circuit board 87 of the flash device 70. Since the contact chips 87a to 87c and the metal contact blade 93 constitute the flash charge switch 51 and the flash selection switch 54, the flash device 70 keeps charging so long as the charging operation member 56 is set in the upper ON position.

Figure 12:
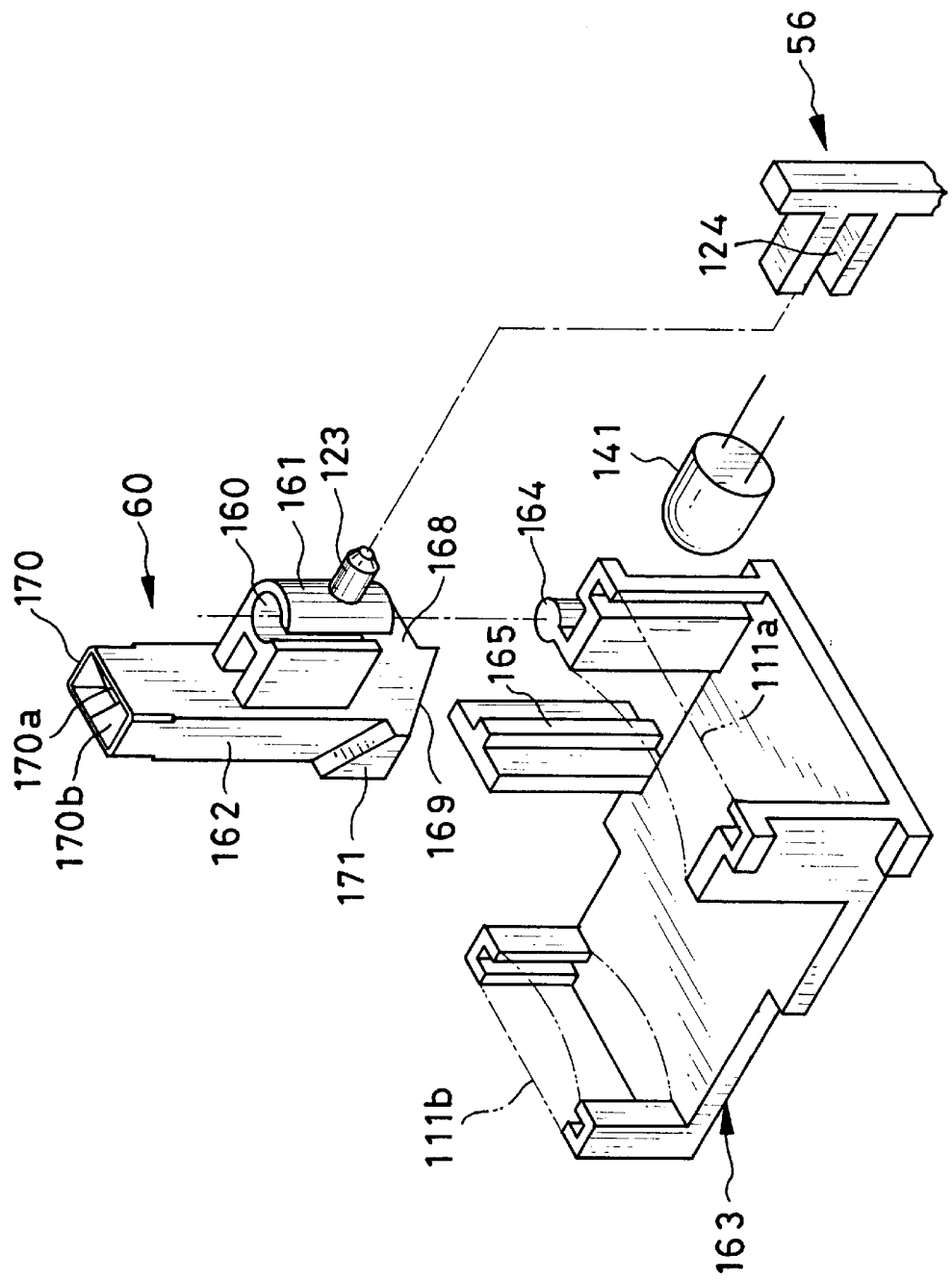
FIG. 12 is an exploded perspective view of an indication device for indicating completion of charging the flash device of the third embodiment and its mounting condition.
Figure 13:
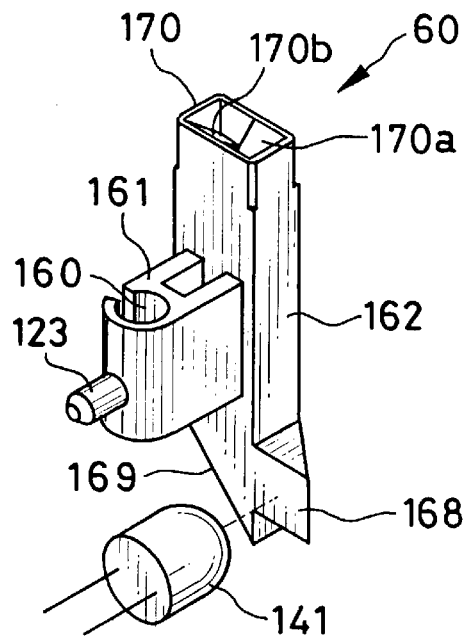
FIG. 13 is a perspective view of the other side of the indication device of FIG. 12.

As shown in FIGS. 12 to 15, the charge condition indicator 60 is formed from a transparent plastic material, and consists of a mounting portion 161 with a mounting sleeve 160 and a light guide portion 162 for conducting light from the indication light emission element 141 by internal reflection. As shown in FIG. 12, the charge condition indicator 60 is attached to a lens holder portion 163 that is formed integrally with the base block portion 85 of the exposure assembly 69 and holds the viewfinder optical system 111a and 111b. The lens holder portion 163 has a guide pin 164 and a supporting rail 165 formed integrally therewith. The mounting sleeve 160 is fitted on the guide pin 164, whereas the supporting rail 165 supports the back of the light guide portion 162. A flange 166 for holding the mounting portion 161 is formed at a lower end of the guide pin 164 integrally therewith.

The light guide portion 162 has a first reflection surface 168 that faces the indication light emission element 141 when the charging operation member 56 comes to the ON position, a second reflection surface 169 that directs the light from the first reflection surface 168 upwards, a light projecting end 170 for projecting the light from the second reflection surface 169 outside the film unit 10 for showing the completion of charging. The light guide portion 162 further has a reflection surface 171 for reflecting the light from the second reflection surface 169 toward an optical axis of the viewfinder optical system 111a and 111b.

The light projecting end 170 has a pair of oppositely inclined reflection surfaces 170a and 170b for projecting the light forward and rearward of the film unit 10, so that both the photographer and the person to photograph can see when the flash device 70 is charged up. Therefore, not only the photographer can confirm that the film unit 10 gets ready for a flash photograph, but alos the person to photograph can pose after the photographer gets ready to take a flash photograph. Because of the third reflection surface 171, the photographer can see the light from the indication light emission element 141 while looking into the finder eyepiece window 14c, so that the photographer can see the completion of charging without stopping framing.

The operation of the film unit 10 shown in FIG. 7 will be briefly described.

First, the view changing knob 57 is operated to change over the field of view between the high-vision size, the panoramic size and the conventional size by inserting one of the panoramic size view window 112, the conventional size view window 113 and the cutout 114 of the view changing plate 82 into the viewfinder objective window 14, for assigning a corresponding print format to each picture frame. In cooperation with the view changing plate 82, the rotary lever 83 rotates to slide the data switching plate behind the light-shielding plate 81. Thereby, dots of a number corresponding to the view field may be recorded as the print format data on the filmstrip 65.

Figure 14:
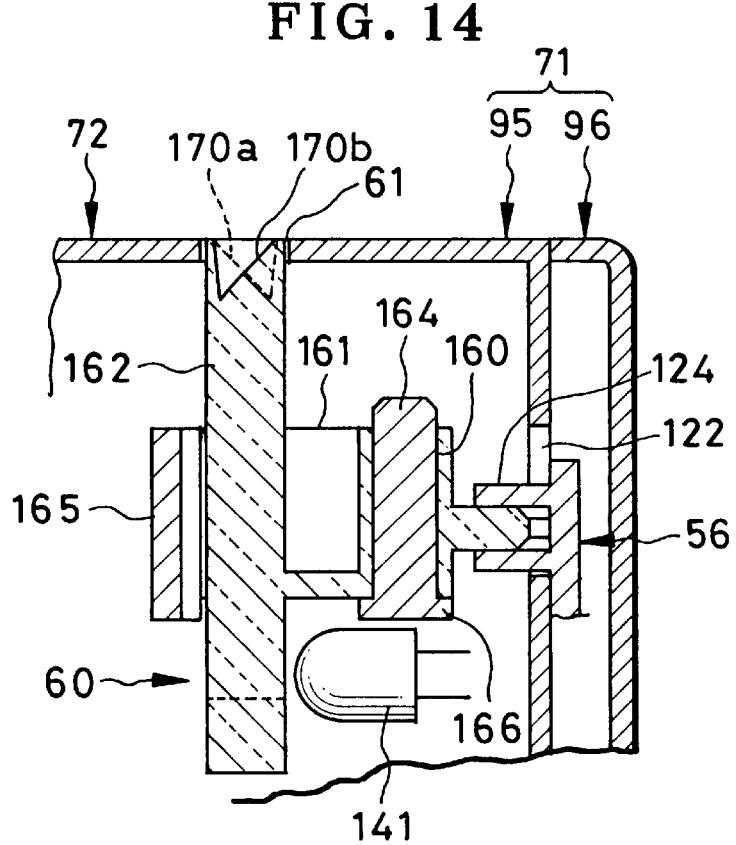
FIG. 14 is a sectional view illustrating the indication device of FIG. 12 in the state where the flash device is not used.
Figure 15:
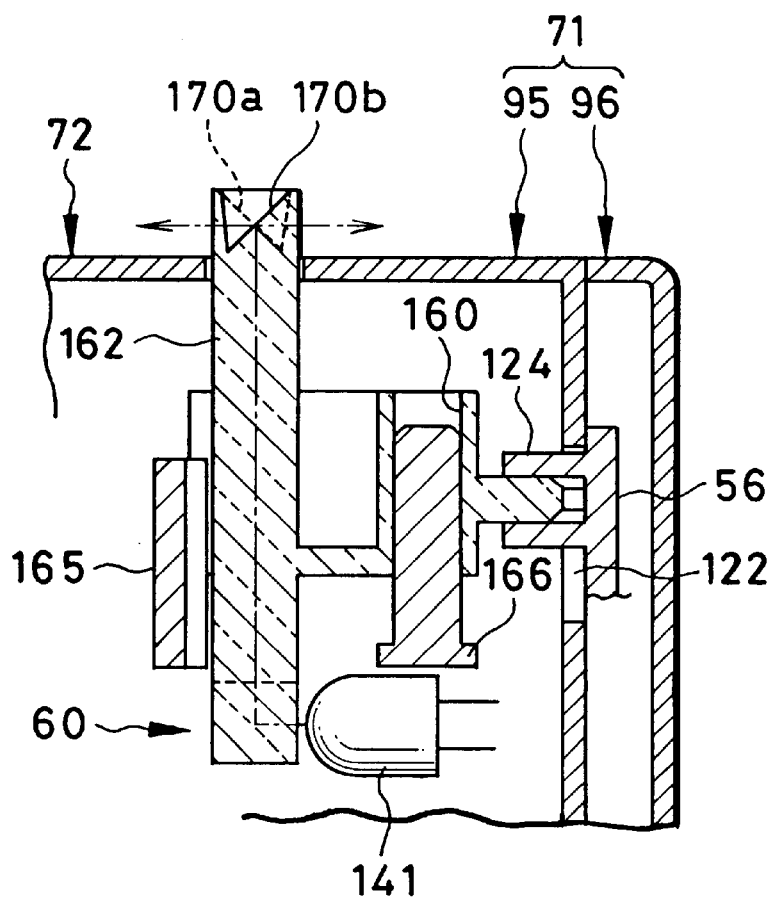
FIG. 15 is a sectional view illustrating the indication device of FIG. 12 in the state where the flash device is used.

When taking a flash photography, the charging operation member 56 is slid from the lower OFF position to the upper ON position. When the charging operation member 56 is in the OFF position, the charge condition indicator 60 is located inside the film unit 10 as shown in FIGS. 7 and 14. As the charging operation member 56 is slid to the ON position, the engaging portion 124 of the charging operation member 56 engaged with the pin 123 of the charge condition indicator 60 moves upward along the slot 122. Thereby, the charge condition indicator 60 moves upward along the guide pin 164 and the supporting rail 165, protruding the light projecting end 170 out of the film unit 10 through the opening 61, as shown in FIGS. 8 and 15. At the same time, the first reflection surface 168 comes to face the indication light emission element 141.

When the charging operation member 56 comes to the ON position, the notch in the slit 126 of the base portion 121 of the charging operation member 56 clicks with the pin 127 on the front cover main body 95, and the boss formed on the back of the button portion 120 of the charging operation member 56 pushes the metal contact blade 93 of the flash device 70 through the opening 88 of the front cover main body 95. Thus, the contact tips 93a to 93c are brought into contact with the contact chips 87a to 87c of the circuit board 87, turning on the flash charge switch 51 and the charge selection switch 54. As a result, the blocking oscillator circuit consisting of the oscillation transistor 22 and the oscillation transformer 23 starts oscillating.

The high voltage current that flows through the secondary coil 32 during the oscillation is supplied to the charging-discharging section 40 through the rectifying diode 25, and is charged in the main capacitor 41 and the triggering capacitor 44. When the voltage across the main capacitor 41 reaches the set charge voltage, the Zener current flows through the Zener diode 37, so that the stopping transistor is turned on to stop charging.

When the main capacitor 41 is charged up to the set charge voltage, the indication light emission element 141 is turned on. The light from the indication light emission element 141 is conducted through the light guide portion 162 to the light projecting end 170, and is projected concurrently forward and rearward of the film unit 10 by being reflected from the reflection surfaces 170a and 170b. Thus, the photographer and the person to photograph simultaneously see when the flash device 70 is charged up. Since the light from the indication light emission element 141 is conducted to the viewfinder optical system 111a and 111b through the second and third reflection surfaces 169 and 171, the photographer can confirm the completion of charging while framing.

When the photographer press the shutter button 18, the shutter mechanism of the exposure unit 19 is released, and the synchronizing switch 46 is turned on in cooperation with the shutter releasing. As a result, the flash discharge tube 42 discharges through the flash selection switch 54, and thus a flash light is projected from the flash projector 17 toward the subject. The light reflected from the subject is focused onto the filmstrip 65 through the taking lens, recording a picture frame. When the synchronizing switch 46 is turned on, the data recording light emission element 136 is also turned on for a constant time to photographically record the print format data on the filmstrip 65 on a margin of the picture frame.

To take a photograph without flash light, the shutter button 18 is pressed while the charging operation member 56 is set to the OFF position. Upon the synchronizing switch 46 being turned on in cooperation with the shutter releasing, the flash device 70 does not flash at that time, but the data recording light emission element 136 is turned on for the constant time. Thereby, the print format data is photographically recorded on the filmstrip 65 in correspondence with the size of the view field selected at that time.

By setting the charging operation member 56 to the ON position after an exposure, the flash device 70 automatically starts charging for the next exposure. So long as the charging operation member 56 is in the ON position and thus the flash charge switch 51 and the flash selection switch 54 are in the ON condition, the blocking oscillator circuit operates continually and the indication light emission element 141 emits light continually even after the completion of charging the main capacitor 41. Accordingly, it is easy to know whether the charging operation member 56 is in the ON position or not, so that the charging operation member 56 will be reset to the OFF position without fail when there is no need for charging. In this way, the film unit 10 of FIG. 7 solves the problem of wasting the battery 21 so much that the battery 21 is run down and the flash device 70 does not work any further.

Figure 16:
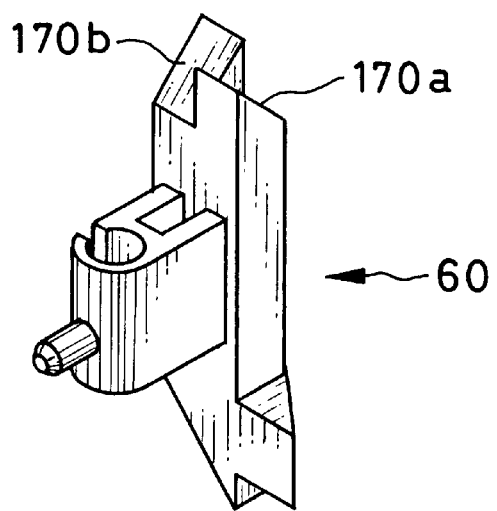
FIG. 16 is a perspective view illustrating a second example of light guide portion of the indication device.

Although the reflection surfaces 170a and 170b of the light projection end 170 of the charge condition indicator 60 are provided in a recess formed in the upper end of the light guide portion 162 in the above embodiment, it is possible to provide the reflection surfaces 170a and 170b directly at the upper end of the light guide portion 162, as shown in FIG. 16.

Figure 17:
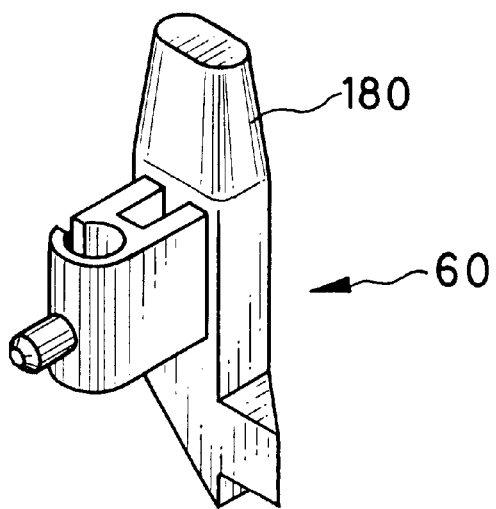
FIG. 17 is a perspective view illustrating a third example of light guide portion.
Figure 18:
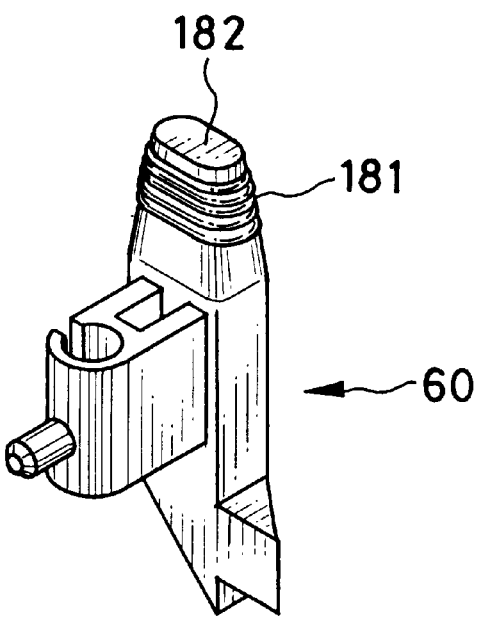
FIG. 18 is a perspective view illustrating a fourth example of light guide portion.
Figure 19:
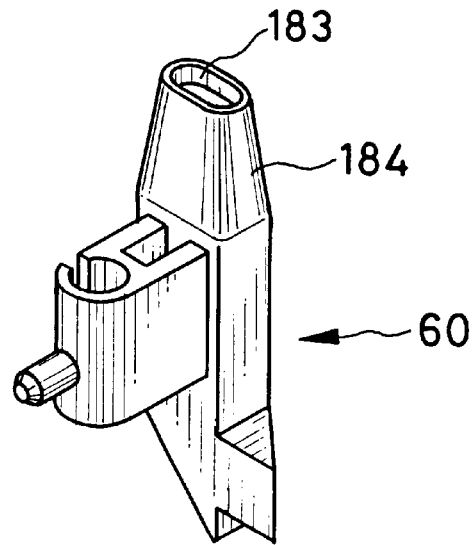
FIG. 19 is a perspective view illustrating a fifth example of light guide portion.

It is also possible to provide a charge condition indicator 60 with a light projecting portion 180 that is tapered to an upper tip, as shown in FIG. 17, or a light projecting portion 182 that is tapered to an upper tip and has grooves 181 around its periphery, as shown in FIG. 18, or a light projecting portion 184 that is tapered to an upper tip and has a recess 183 in the upper tip, as shown in FIG. 19.

Figure 20:
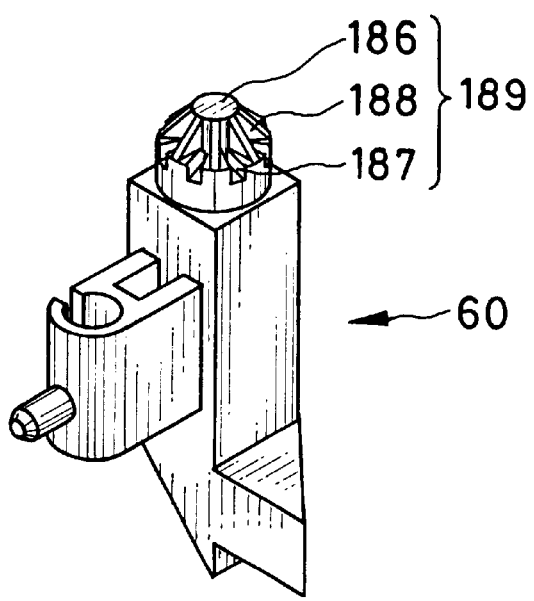
FIG. 20 is a perspective view illustrating a sixth example of light guide portion.

Furthermore, it is possible to provide a charge condition indicator 60 with a light projecting portion 189 that consists of a center cylindrical portion 186 and radial cutouts 187 and radial ribs 188 formed around the cylindrical portion 186, as shown in FIG. 20. The shape of the light projecting portion of the charge condition indicator 60 should not be limited to those shown in the drawings, but various modifications are possible so far as it can project light such that the photographer and the person to photograph simultaneously see the light from the indication light emission element 141.

In the above embodiments, the charge condition indicator 60 is formed from a transparent plastic material, such as polystyrene. But it is possible to form the charge condition indicator 60 from a semi-transparent or colored transparent plastic material or glass. It is also possible to form the charge condition indicator 60 from a non-colored transparent or semi-transparent material, and design the indication light emission element 141 to project colored light. Also, a semi-transparent plastic material mixed with a light diffusing agent may be used to form the charge condition indicator 60. It is possible to form the charge condition indicator 60 integrally with the charging operation member 56.

Figure 21:
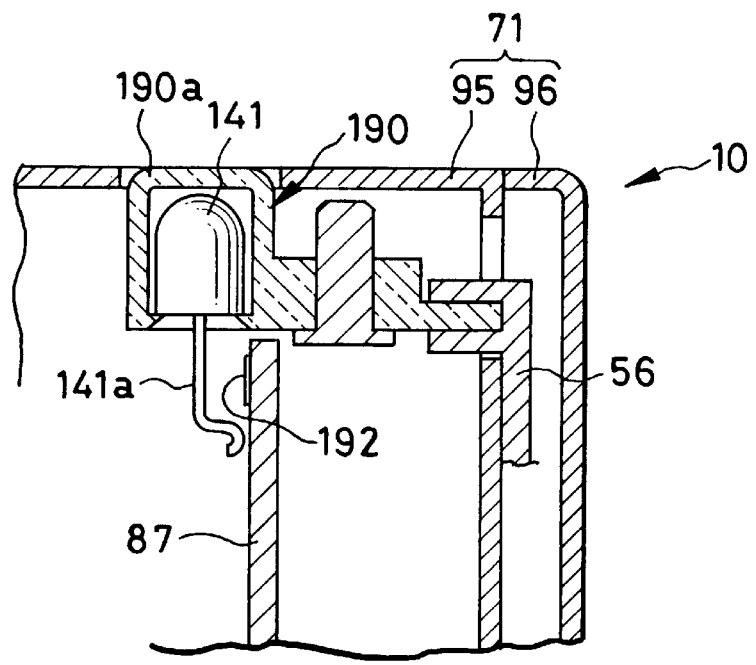
FIG. 21 is a sectional view of essential parts of a completion-of-charging indication device that does not use a light guide, in a state where the flash device is not used.
Figure 22:
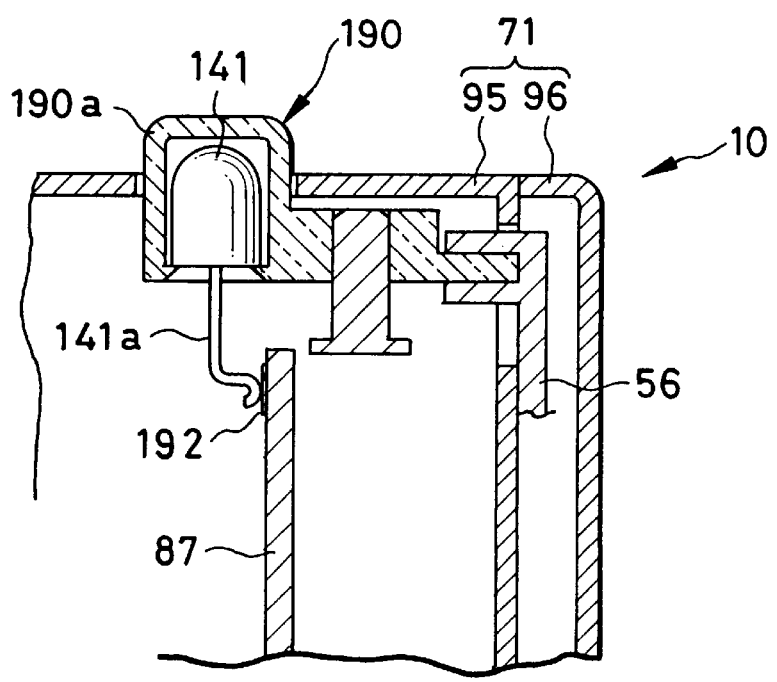
FIG. 22 is a sectional view of essential parts of the completion-of-charging indication device of FIG. 21 in a state where the flash device is used.

In the above embodiment, the device for indicating the completion of charging the flash device 70 is constituted of the indication light emission element 141 secured to the circuit board 87 of the flash device 70, and the charge condition indicator 60 that has the light guide portion 162 for conducting light from the indication light emission element 141 and is slidable to protrude out of the film unit 10. It is alternatively possible to constitute a device for indicating completion of charging by an indication light emission element 141 and a holder 190 holding the indication light emission element 141 therein, as shown in FIG. 21. The holder 190 is formed from a transparent plastic material and is coupled to a charging operation member 56 such that an upper cover portion 190a of the holder 190 protrudes out of a film unit 10, as shown in FIG. 22, by sliding the charging operation member 56 upward to an ON position. The same elements are designated by the same reference numbers as in the above embodiments, so the description of these elements are omitted.

A terminal 141a of the indication light emission element 141 is in resilient contact with a flash circuit board 87, and is brought into contact with a conductive surface 192 formed on the flash circuit board 87 when the holder 190 moves upward along with the charging operation member 56. Since a current flows through the conductive surface 192 at the completion of charging, the indication light emission element 141 emits light at that time. The light from the indication light emission element 141 is radiated through the upper cover portion 190a of the holder 190, so that the person to photograph as well as the photographer notices that the charging is complete.

According to the embodiment shown in FIG. 21, the light indicating the completion of charging may have a larger intensity than when the light is projected through the light guide. Therefore, the charging condition can be seen from a distant. The terminal 141a of the indication light emission element 141 and the conductive surface 192 may also be used as a power switch for the flash circuit.

Instead of providing the indication light emission element 141 with the terminal 141a that is brought into contact with the conductive surface 192 of the flash circuit board 87 as the holder 190 is moved upward, it is possible to connect the indication light emission element 141 to the flash circuit on the circuit board 87 through a flexible wiring cord. The wiring cord should have a length that permits the indication light emission element 141 to move together with the holder 190.

Any of the above described devices for indicating completion of charging are simple in construction, and are able to produce at a low cost.

Figure 23:
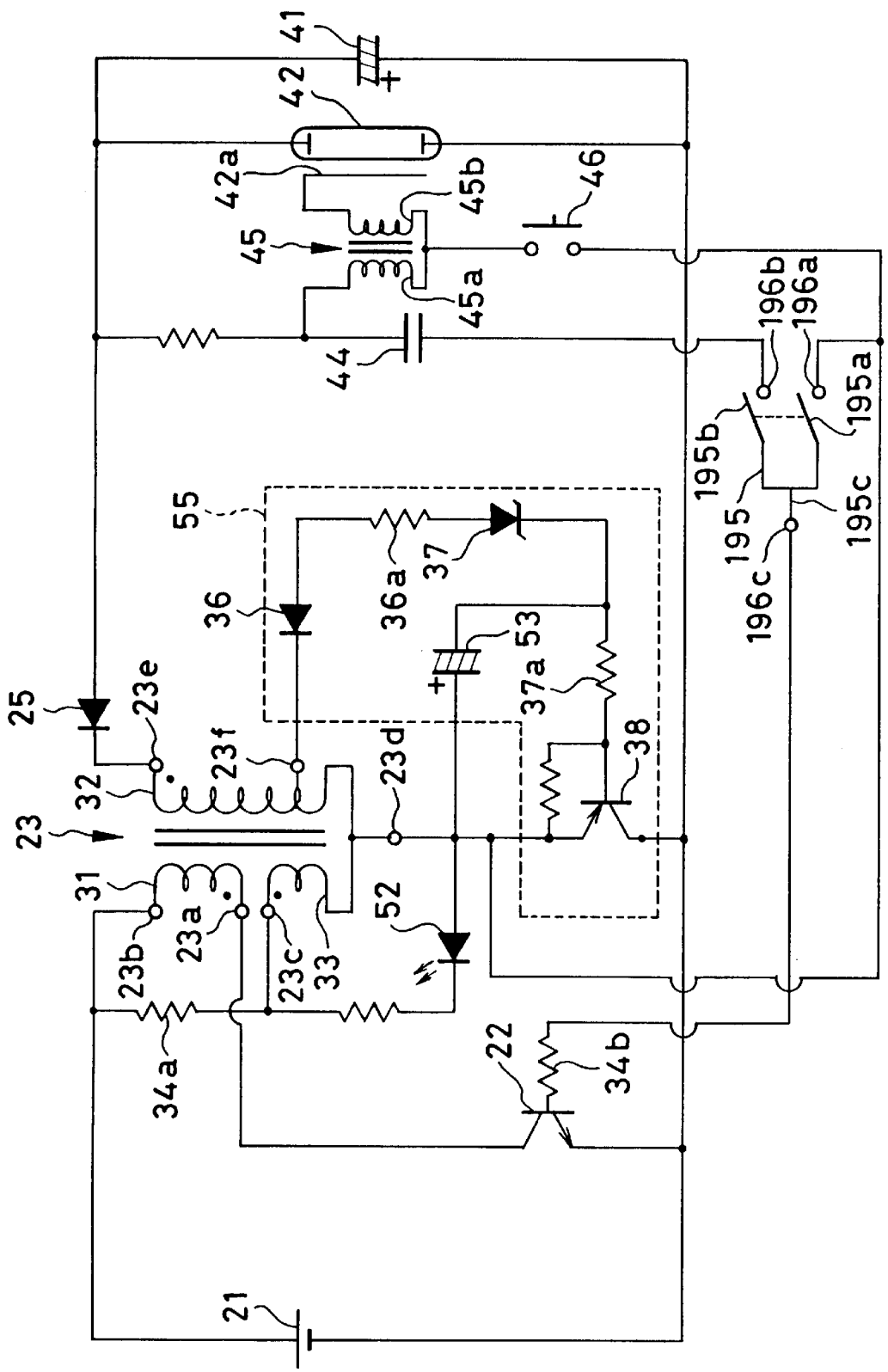
FIG. 23 is a circuit diagram of another embodiment of flash circuit.
Figure 24:
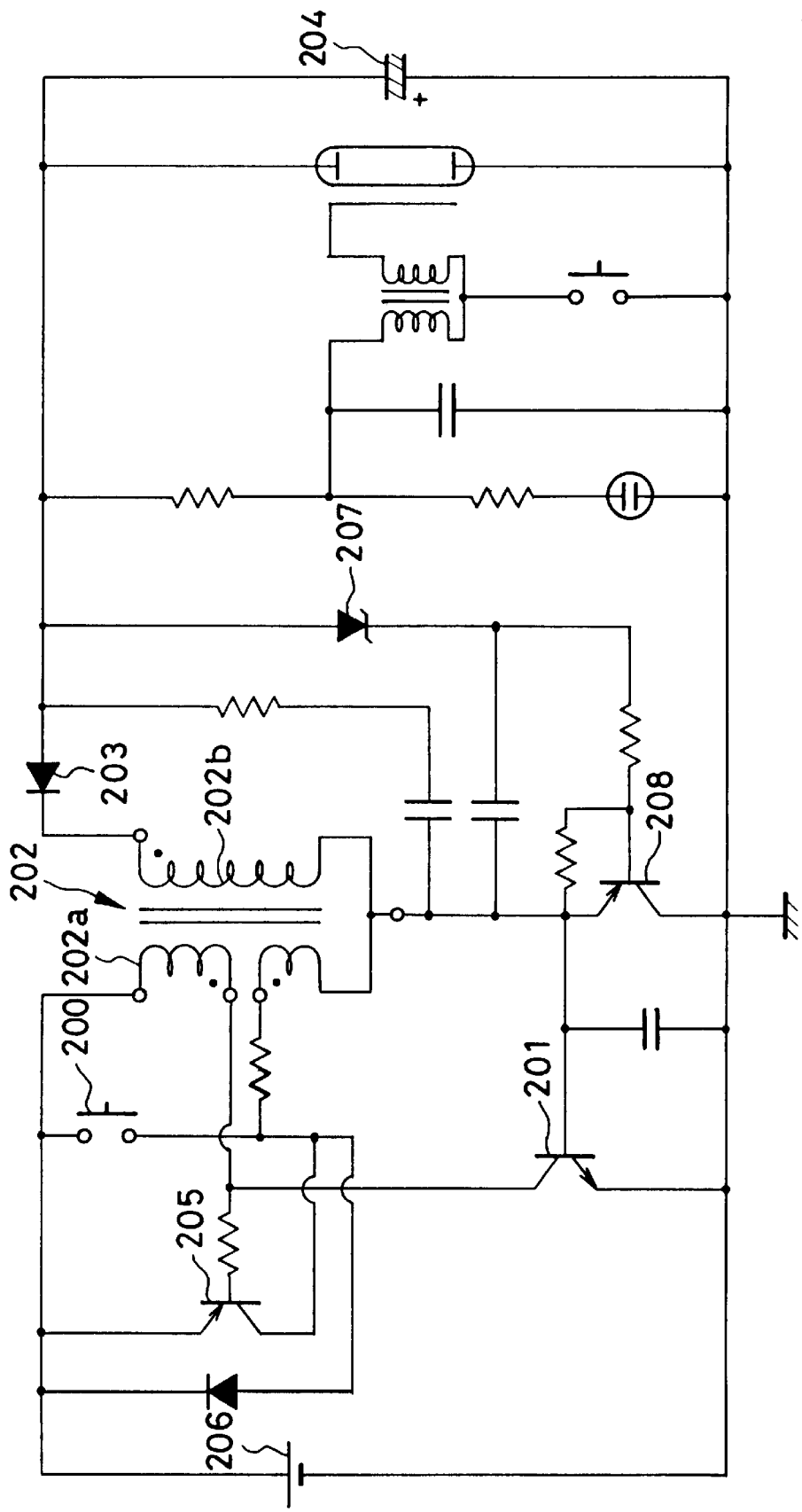
FIG. 24 is a circuit diagram of a conventional flash circuit.

FIG. 23 shows an improvement over the flash circuit of FIG. 5. In the flash circuit of FIG. 23, a switch section, which doubles as a flash charge switch and a flash selection switch, is constituted of a resilient conductive metal blade 195 and first to third contact chips 196a, 196b and 196c. The contact chips 196a to 196c are formed on a flash circuit board. The conductive metal blade 195 has a free end that forks off in two tips 195a and 195b, and a fixed end 196c that is soldered on the third contact chip 196c. Without any load, the free end 195a and 195b is set away from the flash circuit board. When the charge operation member 50 is slid to the ON position, the charge operation member 50 presses the conductive metal blade 195, bringing the free end tips 195a and 195b into contact with the first and second contact chips 196a and 196b. Thus the swtich section, i.e. the flash charge switch and the flash selection switch, is held in the ON position.

In the above embodiment, the forked free end 195a and 195b of the metal blade 195 ensures the tight contact with the first and second contact chips 196a and 196b and thus ensures the electric connection between the contact chips 196a to 196c. However, the free end of the metal blade 195 does not have to be forked if only the metal blade 195 is able to electrically connect the first to third contact chips 196a to 196c to each other. The metal blade 195 may be secured to any one of the first to third contact chips 196a to 196c. It is also possible to separate the metal blade 195 from any contact chips 196a to 196c in the OFF position, and bring the metal blade 195 into contact with the contact chips 196a to 196c in the ON position, though securing one end of the metal blade to one contact chip like the present embodiment is effective to lower the probability of contact failure.

The flash circuit of FIG. 23 is applicable to the film unit shown in FIG. 7. In that case, a data recording circuit like the recording lamp section 133 shown in FIG. 11 should be added to the flash circuit of FIG. 23. Alternatively, it is possible to combine the flash circuit of FIG. 23 with the charging operation member 56 and the charge condition indicator 60 shown in FIG. 10 to provide a flash device for a film unit having no data recording function. In this alternative, when the charging operation member 56 is slid to the ON position, the metal contact 195 connects the contact chips 196a to 196c to each other. Simultaneously, the charge condition indicator 60 slides together with the charging operation member 56 to protrude outside the film unit 10, so that the light from the light emission element 52 is projected through the charge condition indicator 60.

INDUSTRIAL APPLICATION FIELD

As described so far, the present invention is applicable to a flash device for a film unit preloaded with film, and also to a flash device for a compact camera capable of exchanging film and a separate flash device attached to and removable from a camera body as well.

What is claimed is:

1. A flash device comprising a flash circuit and a flash charge switch for charging the flash circuit, characterized by comprising:

a light emission element located inside a camera and emitting light when the flash circuit completes charging; and a light guide mounted slidable in the camera such that the light guide is set in a first position putting an end of the light guide out of the camera when the flash charge switch is turned on, and in a second position putting the end in the camera when the flash charge switch is turned off, the light guide in the first position conducting the light from the light emission element and projecting the light from the end protruding out of the camera, to indicate completion of charging the flash circuit.

2. A flash device as claimed in claim 1, characterized in that the light guide has a block-shape, and partly faces a viewfinder to indicate the completion of charging inside the viewfinder.

3. A flash device as claimed in claim 2, characterized in that the camera is a lens-fitted photo film unit that is provided with a photographic mechanism including a taking lens and is previously loaded with a photo filmstrip on manufacturing.

4. A flash device as claimed in claim 3, characterized in that the end of the light guide is to be protruded from a top side of the lens-fitted photo film unit.

5. A flash device as claimed in claim 4, characterized in that a light projecting portion is provided at the end of the light guide, the light projecting portion projecting the light from the light emission element such that a photographer and a person to photograph can see the completion of charging.

6. A flash device as claimed in claim 1, characterized by comprising a charging operation member that is slidable between a third position for turning on the flash charge switch and a fourth position for turning off the flash charge switch, wherein the light guide cooperates with the charging operation member such that the light guide moves to the first position as the charging operation member is slid to the third position, and that the light guide moves to the second position as the charging operation member is slid to the third position.

* * * * *